US010652600B2

(12) United States Patent
Kaya et al.

(10) Patent No.: US 10,652,600 B2
(45) Date of Patent: *May 12, 2020

(54) GENERATION AND SELECTION OF ACTIONS FOR ENTITIES IN A VIDEO DELIVERY SYSTEM

(71) Applicant: HULU, LLC, Santa Monica, CA (US)

(72) Inventors: Lutfi Ilke Kaya, Santa Monica, CA (US); Bangsheng Tang, Beijing (CN); Tong Yang, Beijing (CN); Christopher Russell Kehler, Santa Monica, CA (US); Chi Zhang, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/254,516

(22) Filed: Jan. 22, 2019

(65) Prior Publication Data

US 2019/0158901 A1   May 23, 2019

Related U.S. Application Data

(63) Continuation of application No. 15/399,702, filed on Jan. 5, 2017, now Pat. No. 10,212,464.

(Continued)

(51) Int. Cl.
*H04N 21/25* (2011.01)
*H04N 21/466* (2011.01)
(Continued)

(52) U.S. Cl.
CPC ........... *H04N 21/252* (2013.01); *G06F 16/70* (2019.01); *G06Q 30/02* (2013.01); *H04N 21/234* (2013.01);
(Continued)

(58) Field of Classification Search
CPC ....... H04N 21/44208; H04N 21/42208; H04N 21/42227; H04N 21/42228; H04N 21/44222
See application file for complete search history.

(56) References Cited

U.S. PATENT DOCUMENTS 5,774,357 A  6/1998 Hoffberg et al.
6,021,403 A  2/2000 Horvitz et al.
(Continued)

OTHER PUBLICATIONS

International Search Report & Written Opinion for PCT Application PCT/US2017/026195 dated Aug. 8, 2017, 13 pages.
(Continued)

*Primary Examiner* — Pankaj Kumar
*Assistant Examiner* — Timothy R Newlin
(74) *Attorney, Agent, or Firm* — Fountainhead Law Group, PC

(57) ABSTRACT

In one embodiment, a method generates actions for entities found on a video delivery system based on information for user behavior of a user on the video delivery system and generates probabilities for the actions for the entities based on the actions for the entities and the user behavior. A probability for an action indicates the probability the user would select that action for an entity when compared against other actions in the set of actions for the set of entities. The method then selects an action feed based on the probabilities for the set of actions. The action feed includes at least a portion of the actions for the entities. The action feed is outputted to the client for display on an interface where an action on an entity in the action feed is performed by the video delivery system when selected by the user on the interface.

20 Claims, 14 Drawing Sheets

550

| Entity | Action | Probability |
|---|---|---|
| Show #1 | 1. Watch Latest Episode<br>2. Watch Next Episode<br>3. Watch Trailer<br>4. Watch Most Popular Episode | 1. 70%<br>2. 90%<br>3. 30%<br>4. 50% |
| Show #2 | Follow | 60% |
| Movie #1 | Watch | 75% |
| Actor #1 | Watch latest Episode | 50% |
| Drama Genre | 1. Watch New Release<br>2. Search For<br>3. Browse/select | 1. 60%<br>2. 30%<br>3. 20% |

552 — Entity; 554 — Action; 556 — Probability

Related U.S. Application Data

(60) Provisional application No. 62/323,235, filed on Apr. 15, 2016.

(51) Int. Cl.
  *H04N 21/482* (2011.01)
  *H04N 21/234* (2011.01)
  *H04N 21/45* (2011.01)
  *G06Q 30/02* (2012.01)
  *H04N 21/81* (2011.01)
  *G06F 16/70* (2019.01)

(52) U.S. Cl.
  CPC ..... *H04N 21/4532* (2013.01); *H04N 21/4667* (2013.01); *H04N 21/482* (2013.01); *H04N 21/8133* (2013.01)

(56) References Cited

U.S. PATENT DOCUMENTS

| | | | |
|---|---|---|---|
| 6,081,750 A | 6/2000 | Hoffberg et al. | |
| 6,245,265 B1 | 6/2001 | Chung et al. | |
| 6,460,036 B1 | 10/2002 | Herz | |
| 7,150,030 B1 | 12/2006 | Eldering et al. | |
| 7,418,431 B1 | 8/2008 | Nies et al. | |
| 7,533,025 B2 | 5/2009 | Coffman et al. | |
| 7,593,921 B2 | 9/2009 | Goronzy et al. | |
| 7,707,601 B2 | 4/2010 | Runne | |
| 8,190,754 B2 | 5/2012 | Strickland | |
| 8,229,888 B1 | 7/2012 | Roskind et al. | |
| 8,249,912 B2 | 8/2012 | Elliott et al. | |
| 8,538,703 B2 | 9/2013 | Kovatchev et al. | |
| 8,712,857 B1 | 4/2014 | Adomato et al. | |
| 8,745,206 B1* | 6/2014 | Chang | H04L 67/22 709/223 |
| 8,938,758 B2 | 1/2015 | Klarfeld et al. | |
| 9,165,280 B2 | 10/2015 | Basson et al. | |
| 9,218,417 B2 | 12/2015 | Eidesen et al. | |
| 9,288,519 B2 | 3/2016 | Lee et al. | |
| 9,560,399 B2 | 1/2017 | Kaya et al. | |
| 2002/0067438 A1 | 6/2002 | Baldock | |
| 2003/0018972 A1* | 1/2003 | Arora | H04H 60/65 725/47 |
| 2003/0101449 A1 | 5/2003 | Bentolila et al. | |
| 2003/0103627 A1 | 6/2003 | Nierzwick et al. | |
| 2003/0106058 A1 | 6/2003 | Zimmerman et al. | |
| 2003/0149675 A1 | 8/2003 | Ansari et al. | |
| 2003/0163811 A1 | 8/2003 | Luehrs | |
| 2003/0208755 A1 | 11/2003 | Zimmerman | |
| 2003/0233436 A1 | 12/2003 | Slemmer et al. | |
| 2005/0028191 A1 | 2/2005 | Sullivan et al. | |
| 2005/0055708 A1 | 3/2005 | Gould et al. | |
| 2005/0090911 A1 | 4/2005 | Ingargiola et al. | |
| 2005/0114539 A1 | 5/2005 | Yoon et al. | |
| 2005/0228881 A1 | 10/2005 | Reasor et al. | |
| 2005/0251827 A1 | 11/2005 | Ellis et al. | |
| 2006/0232551 A1 | 10/2006 | Matta | |
| 2007/0157260 A1 | 7/2007 | Walker | |
| 2007/0162440 A1 | 7/2007 | Gutta et al. | |
| 2007/0240181 A1 | 10/2007 | Eldering et al. | |
| 2007/0245398 A1 | 10/2007 | Roden | |
| 2008/0059409 A1 | 3/2008 | Montpetit | |
| 2008/0092057 A1 | 4/2008 | Monson et al. | |
| 2008/0301746 A1 | 12/2008 | Wiser et al. | |
| 2010/0115592 A1 | 5/2010 | Belz et al. | |
| 2010/0211636 A1 | 8/2010 | Starkenburg et al. | |
| 2010/0333128 A1 | 12/2010 | Smith et al. | |
| 2011/0137520 A1 | 6/2011 | Rector et al. | |
| 2011/0185437 A1 | 7/2011 | Tran et al. | |
| 2011/0302488 A1 | 12/2011 | Lee et al. | |
| 2012/0159372 A1 | 6/2012 | Stallings et al. | |
| 2012/0204201 A1 | 8/2012 | Cassidy et al. | |
| 2012/0278899 A1 | 11/2012 | Mahan | |
| 2012/0324504 A1 | 12/2012 | Archer et al. | |
| 2013/0065555 A1 | 3/2013 | Baker et al. | |
| 2013/0067382 A1 | 3/2013 | Townsend et al. | |
| 2013/0069769 A1 | 3/2013 | Pennington et al. | |
| 2013/0110803 A1 | 5/2013 | Mikalsen et al. | |
| 2013/0136424 A1 | 5/2013 | Fontan et al. | |
| 2013/0204664 A1 | 8/2013 | Romagnolo et al. | |
| 2013/0297307 A1 | 11/2013 | Paek et al. | |
| 2013/0342556 A1 | 12/2013 | Kildal et al. | |
| 2014/0053105 A1 | 2/2014 | Sakata et al. | |
| 2014/0053196 A1 | 2/2014 | Selim | |
| 2014/0129942 A1 | 5/2014 | Rathod | |
| 2014/0282178 A1 | 9/2014 | Borzello et al. | |
| 2015/0312632 A1 | 10/2015 | Hoctor et al. | |
| 2016/0019779 A1 | 1/2016 | Park | |

OTHER PUBLICATIONS

Canadian Office Action for Application 3,020,660 dated Aug. 2, 2019, 6 pages.

\* cited by examiner

| Entity | Action | Probability |
|---|---|---|
| Show #1 | 1. Watch Latest Episode<br>2. Watch Next Episode<br>3. Watch Trailer<br>4. Watch Most Popular Episode | 1. 70%<br>2. 90%<br>3. 30%<br>4. 50% |
| Show #2 | Follow | 60% |
| Movie #1 | Watch | 75% |
| Actor #1 | Watch latest Episode | 50% |
| Drama Genre | 1. Watch New Release<br>2. Search For<br>3. Browse/select | 1. 60%<br>2. 30%<br>3. 20% |

GENERATION AND SELECTION OF ACTIONS FOR ENTITIES IN A VIDEO DELIVERY SYSTEM

CROSS REFERENCE TO RELATED APPLICATIONS

This application is a continuation application and, pursuant to 35 U.S.C. § 120, is entitled to and claims the benefit of earlier filed application U.S. application Ser. No. 15/399, 702 filed Jan. 5, 2017, which claims priority to U.S. Provisional App. No. 62/323,235, entitled "Contextual Generation of Actions for a Watch List of Entities in a Video Delivery System," filed Apr. 15, 2016, the contents of all which are incorporated herein by reference in its entirety.

BACKGROUND

Television (TV) broadcast has been a medium where users were responsible for tracking content and scheduling their lives around the schedule of shows on the TV broadcast. As a result of this reactive nature of the TV broadcast, users miss content that they would not miss otherwise if they were given a chance to watch it. Some reasons for missing content can be the user not being available to watch the content at a certain time (and having to manually program a digital video recorder (DVR) to record the content), or not knowing that the content is being broadcasted or is available for only a short period of time. Also, in the case that the content is indefinitely available—simply not knowing that the content exists. For example, a user may have a favorite actor, and that actor may appear as a guest actor in a single episode of a TV show. The user may never have watched a TV show, and may not be interested in watching the whole TV show at the moment, but it is possible the user would watch that one episode and see how the actor performed if the user knew of the episode. With how current TV broadcast works, the user would have to find out independently that the actor appeared in the episode, search for the episode, and then record or watch the episode when the episode is broadcasted at a certain time. The user always has to know the schedule, manage the schedule, and track events.

DETAILED DESCRIPTION

Described herein are techniques for a system to generate actions for entities. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments generate and rank actions for entities instead of just suggesting content on a video delivery service. An action feed is generated that includes actions for entities that have been ranked against other actions for entities. Then, at least a portion of the actions can be displayed to a user via a user interface. For example, entities can be television (TV) shows, movies, people, genres, topics, sports teams, events and so on. Actions may include watch-specific actions and non-watch-specific actions, such as watch actions, follow actions, try actions, etc. Some examples of watch actions are "Start Watching Show #1", "Resume Watching Show #2", "Watch Trending Clip from Show #3", and "Watch a Sports Game Live". Some examples of non-watch actions include "Remind Me to Watch Event #1", "Follow Actor #1", and "Try No Commercial Add-on Package". Particular embodiments may use a real-time context for a user and generate a ranking of actions for entities that are suggested to a user to perform at that current time. Then, at least some of the actions are provided to the user.

Overview

Figure 1:
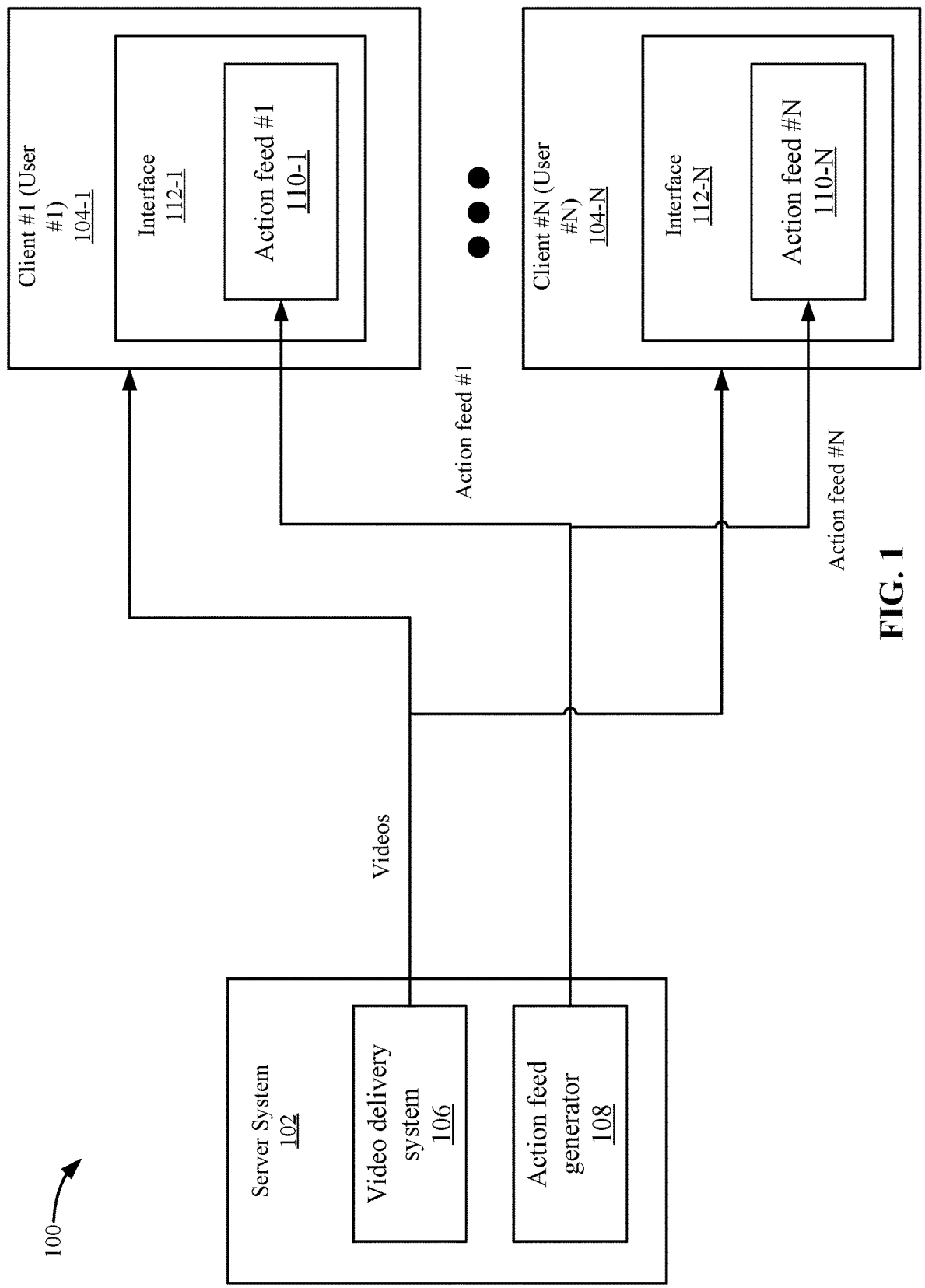
FIG. 1 depicts a simplified system for generating and providing an action feed according to one embodiment.

FIG. 1 depicts a simplified system 100 for generating and providing an action feed according to one embodiment. System 100 includes a server system 102 and multiple clients 104-1 to 104-N. Other components of a video delivery network may also be appreciated, such as content delivery networks, but are not shown. Also, server system 102 may include multiple servers and any number of clients 104 may be used.

A video delivery service may use a video delivery system 106 to provide content to users using client devices 104. Although a video delivery service is described, the video delivery service may provide content other than videos. For example, the video delivery service may include a library of media programs (e.g., videos, audio, or other forms of streamable content). Users may watch media programs that are available in the library through video delivery system 106 at any time. The library includes different kinds of media programs, such as movies, shows, shorts, clips, trailers, etc. The shorts, trailers, and clips may be shorter versions or previews of movies or shows. Movies are released once whereas shows include episodes that may be released (or initially aired) on a set schedule during seasons. For example, the multiple episodes for the shows may be released daily, weekly, or on another schedule. Typically, the shows may be released seasonally, that is, a set number of episodes for a show may be released during a season, such as a four-month season during which an episode is released every week.

In the video delivery service, the content that a user can request is being refreshed regularly. For example, shows may include episodes that, when in season, are released onto the video delivery service weekly, daily, or in other intervals. This means the content is not stale. Although video delivery system 106 may provide shows that release episodes on a schedule, video delivery system 106 allows users to request the shows on-demand, such as once an episode for the show is released, the user may watch the episode at any time. This may be different from a user watching shows on a cable television system. In a cable television system, once the episode of the show is aired, the user cannot watch the show on demand unless it is offered on demand or the user recorded the show using the DVR. However, the cable television system may not receive an indication when a user watches the recorded shows on the DVR. But, for the video delivery system, the user needs to request the show from the service to watch the show. Also, a system that releases only single videos (e.g., movies) or all episodes for a show at once does not have the recurring timing information of when a user views released episodes week after week (or any other release schedule). Accordingly, the video delivery service faces a unique situation when releasing episodes of a show and also being able to record when a user watched the episodes. This allows the video delivery service to read contextual actions of the user with respect to entities (e.g., videos) on the video delivery service. Also, the videos released may be from a cable broadcast from content sources that then provide the videos to the video delivery service for release. Further, video delivery system 106 may provide linear television via the same service. The linear television may be similar to the cable television system described above. However, the linear television options can be blended with on demand options in an interface 112.

In one embodiment, the availability of both on demand and live options may complicate the recommendation process. That is, there may be different options for a user to watch content, such as there may be a live version and an on demand version of the same content. Additionally, a third option where a user records some content (like a digital video recorder) may also be available. Particular embodiments solve this problem by ranking actions for entities instead of just determining what content is relevant. This allows recommendations for content that can be delivered differently to be ranked together.

An action feed generator 108 may generate an action feed 110 that includes actions for entities that each user may display on user interfaces 112-1-112-N. An entity may be something in which an action can be performed in the video delivery service. The entity may be something that exists as itself, as a subject or as an object, actually or potentially, concretely or abstractly, physically or virtually. For example, a TV show may be a video entity; an actor, director, or another person associated with the TV show may be a person entity; an adult animation may be a genre entity; a specific movie may be a movie entity; a specific user may be a user entity, and so on.

Action feed generator 108 uses a ranking of actions for entities against each other to determine a personalized order of actions for entities for action feed 110. Action feed generator 108 may then provide a personalized action feed 110 to each user on each user interface 112. Action feed 110 may include actions in a predicted order that action feed generator 108 thinks the user will want to perform at a given time.

To generate the actions, action feed generator 108 detects patterns in historical user behavior on the video delivery service, and ranks actions that fit into this behavior higher. As a result, action feed generator 108 can recommend actions to users as the actions are available, and not just full TV shows and movies that are related with the past shows and movies the user has watched.

Action feed generator 108 can display suggested actions to the user in several different categories or areas of user interface 112. When user interface 112 is discussed, it will be understood that this may be the interface displaying pages for an application, the application itself, and/or the physical interface on client 102. When a page is referred to, it will be recognized that this could be a section of the page. There can be pages in user interface 112 that contain categories of entities. When the user navigates to the page, a suggested action for each entity can be presented. The user can then take the action with a selection, such as a single selection, or the system can automatically take the action itself—starting playing without user engagement. In another example, the core surface point can be a dedicated area of user interface 112. When users turn on their client device 104 for the video delivery service, the users can be immediately presented with one or more suggested actions in a dedicated area of user interface 112. Another surface point can be the media player experience itself. By way of example, while the user is watching a piece of content (e.g., after taking a previous action), the user can browse through alternative actions. Likewise, once the user reaches the end of a piece of content, action feed generator 108 can suggest what to do next, in other words what action to take next, and even automatically take the top suggested action on behalf of the user—creating an autoplay experience. For example, a user watching Show #1 and nearing the end of a particular episode can be suggested the actions "Continue Watching Show #1", "Watch Another Adult Animation", "Watch Movie #1 (movie saved for later by the user)", and action feed generator 108 can automatically take the first action—playing the next episode of Show #1. Thus, when action feed 110 is discussed, it will be recognized that this could be a distributed list where the suggested actions in the action feed may be displayed in various different areas within the user interface 112 or may be displayed as a single list. Also, action feed generator 108 can proactively reach out to the user outside of the experience as well. For example, notifications can be sent out when an extremely relevant or time sensitive action is available. The system can be integrated with operating system (OS) and platform assistants and/or feeds.

Action feed generator 108 may personalize the action feed for every user of the video delivery service. For example, if a user #1 is using client #1, a personalized action feed #1 is displayed in a page for that user. For another user # N, client # N displays a personalized action feed # N for that user. This requires that individual user behavior be monitored and incorporated into the action feed generation process, which will be described below. Building action feed 110 may require action feed generator 108 to filter a large amount, such as tens of thousands of potential actions (at least one for each user and entity combination), down to a limited number of actions—even one. The video delivery service also has a large number of users, each of which need a personalized action feed generated. This means an automated process of generating the action feed is needed. The following will describe the different parts of the action feed generation in more detail.

Action Feed Generator

Storage Description

Figure 2:
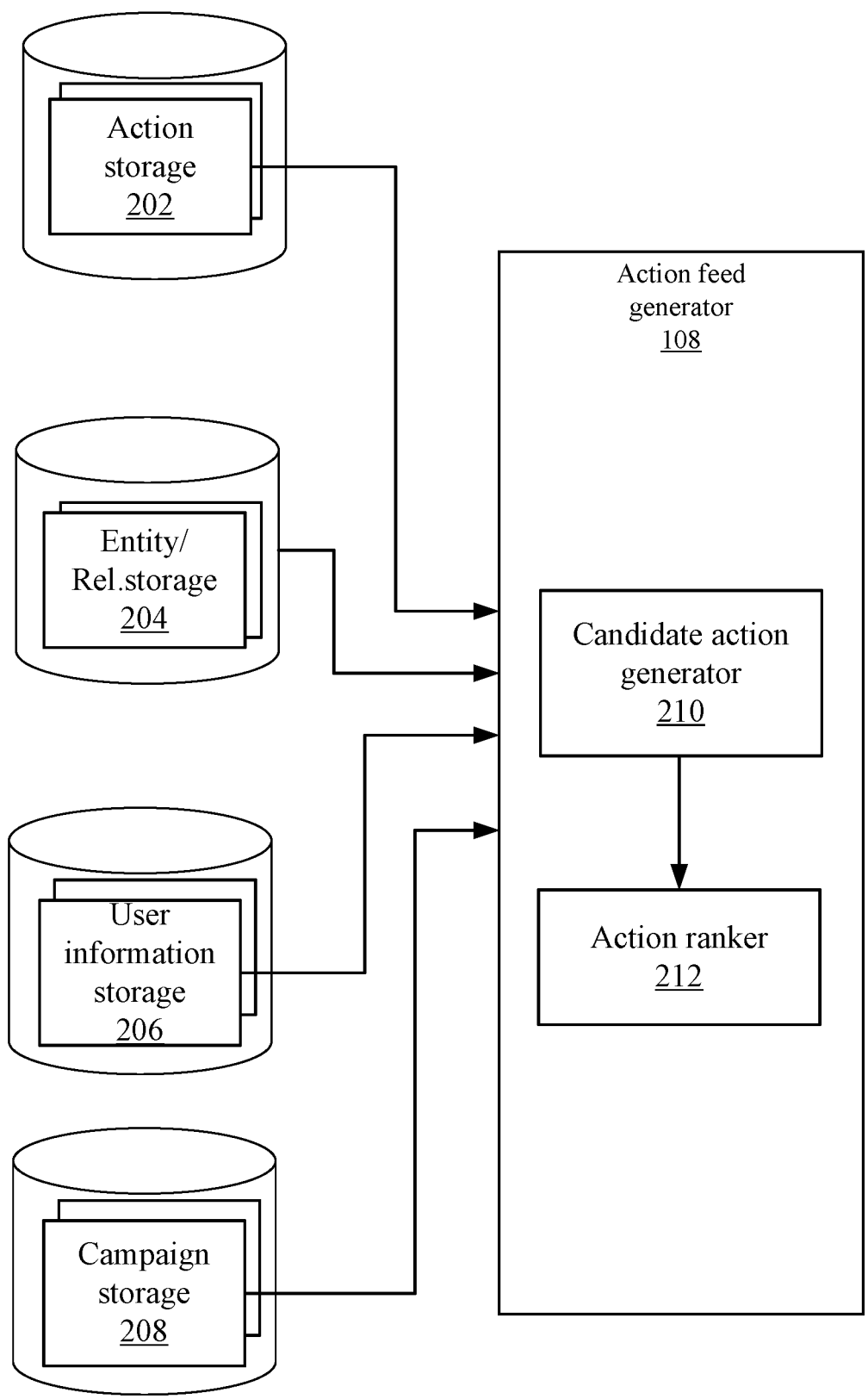
FIG. 2 depicts a more detailed example of an action feed generator according to one embodiment.

FIG. 2 depicts a more detailed example of action feed generator 108 according to one embodiment. Action feed generator 108 sources different information to generate actions for entities. For example, information from an action storage 202, an entity/relationship storage 204, user information storage 206, and campaign storage 208 may be used to generate actions. The information in each storage may be historical and/or real-time information. Real-time information may be information based on a current context for a user, such as the time of day, what page the user is viewing on interface 112, a selection by a user, etc. The information in each storage device will be described first and then how the information is used will be described.

Action storage 202 may store actions that can be associated with entities. The action describes a potential interaction between a user and the video delivery service. In one embodiment, actions that a user can perform on the video delivery service, such as with a remote control, may be eligible as an action in action storage 202. The actions can include both watch actions and non-watch actions. This is different from providing an icon of a video in which only one function is associated with the icon and the selection of the icon ultimately leads to watching the video. For example, the watch actions may include different types of watch actions whereas only one function is associated with the icon. The examples of actions may include categories, such as watch, save for later, follow, set a reminder, and go to a destination within the video delivery service. Each action category may have more granular actions described within it, such as "start watching", "continue watching", "watch latest episode", and "watch live" are examples of watch actions in the watch category. Additionally, in the go-to actions category, the actions of "go to news hub" and "learn more" may be examples of non-watch actions. Although these actions are described, these are only examples, as other actions may be appreciated.

Examples of actions include continue watching actions, actions over followed or favorite entities, action-over-trends, recommended actions, and promoted actions. The actions may include watch and non-watch actions. For example, the non-watch actions may include follow, add an entity, or search for an entity.

The continue watching actions may generate actions for a user to resume watching a specific piece of content or continue watching a serial piece of content. For example, the action may be resume watching a movie that the user has not finished or continue watching a television show by watching the next episode.

Actions over followed or favored entities may be actions over entities that are specifically followed and/or favorited by the user. These are entities that have been specifically tracked by the user, such as the user has watched, favorited, or followed the entity. These actions may include watch the latest episode of show #1, watch a sports team vs. another team live, watch a recent interview with a person #1, watch the latest news on a current event, and so on.

The action-over-trends may generate actions that capture something trending. This may include any type of trend that the video delivery service determines by either mass engagement on the video delivery service, calling of current events on the web, or trending events that are input into the video delivery service. Some examples of actions-over-trends include watching a trending clip of a show, watch a live current event, or start watching a premiere for a television series.

Recommended actions generate actions to introduce new content to the user based on the user information, such as the user's interests, tastes, and habits. This includes start watching a television show because the user is a fan of the creator, watching the season finale of the television show because the user is into reality TV, or watching a movie because the user typically watches a movie on a Friday night.

Promoted actions generate actions that are promoted based on the video delivery service campaigns, such as campaign goals, sponsorships, or up-sales. By including promoted actions, then the entities that are included in active campaigns are considered as being surfaced as an action for a user.

Entity/relationship storage 204 may store entities and their relationships. To suggest actions for entities, relationships among entities are needed. An entity may be a video that can be played, but may be something other than a video. For example, a TV show may be an entity; an actor, director, or another person associated with the TV show may be a person entity; an adult animation may be a genre entity; a specific movie may be a movie entity; a specific user may be a user entity, and so on.

A relationship connects two entities. For example, a user #1 who watched a show #1 may have a "watched" relationship between the user #1 entity and the show #1 entity. Relationships may also have properties, such as the timestamp of when show #1 was watched for the watched relationship. Additionally, relationships themselves may be entities, and thus there can be a relationship between entity and a relationship or between two relationships. For example, a new show can mention a guest appearance of a celebrity in a talk show, and this would be a "mention" relationship between the new show and the "appeared in" relationship between the celebrity and the talk show. An example of a relationship between two relationships would be an actor in a show being influenced by another actor in another show in an "influenced by" relationship between the two "acted in" relationships.

User information storage 206 may store a user profile, user context, user behavior, and inferences. The user information is a collection of different information about the user, which may be historical information or real-time information from a current session when the user is using the video delivery service. Each user may have personalized information stored in user information storage 206.

The user profile may include information that the video delivery service knows about the user. This information may be determined through various methods. For example, the video delivery service may receive the user profile information directly from the user in the form of questionnaires (e.g., during the registration experience), through explicit feedback from the user (e.g., whether a user likes or dislikes a video), or can be inferred from user behavior. The user profile information may be categorized into different categories, such as interests, tastes, and habits. In one example, interests may be entities that the user shows an affinity towards, such as various shows, actors, television networks, sports teams, etc. The interests may be further categorized by separating inferred interests from interests explicitly stated by the user through a mechanism in the video delivery service, such as a follow or favorite mechanism. The taste information is an abstraction over properties of entities the user is interested in, such as various comedies, movies, sports, etc. Habits are recurring behavioral patterns, such as what a user watches in the morning, weekend, at night, etc. A user profile may not change based on context. That is, the user profile information does not change whether it is 9:00 a.m. or 9:00 p.m., the weekend, or the user is in a different location.

The user context is a situation on the video delivery service associated with the user in real-time. For example, the user context may be the time of day, day of the week, the geographical location of the user, the device the user is using, the video the user is watching, etc. The user context may be determined during the session in which the user is using the video delivery service. Although the user context is described as being stored, the user context may be automatically determined and does not need to be "stored" in user information storage 206.

The user behavior is a collection of user actions that were performed by the user. This also includes the lack of actions, such as the user decided not to start watching a video. Other user behaviors include the user started watching a video, searched for a video, navigated to a television show page, but did not watch the video. Inferences may be conclusions reached by action feed generator 108 by observing user behavior in a given context. Inferences lead to learning and these learnings may influence the user profile in interests, tastes, and habits.

Campaign storage 208 may store campaigns for the video delivery service. For example, a campaign may promote an entity, such as a media program or product. The campaign may include start and end dates, impression goals, and current progress. For example, the video delivery service may receive money for promoting a media program. The campaign may specify a number of impressions that are required for the campaign.

Candidate Action Generation

Using the above information for storage 202-208, a candidate action generator 210 generates candidate actions that are possible for a user. Candidate actions are possible actions that can be applied to entities based on a context associated with the user. For example, candidate action generator 210 generates actions that can be applied to entities at the current time based on current (or future) availability of the entities on the video delivery service. To generate the candidate actions, candidate action generator 210 may generate an entity relationship graph using the entities and relationships from entity/relationship storage 204. Then, candidate action generator 210 may perform an entity-to-content matching process to determine candidate actions for entities.

Figure 3:
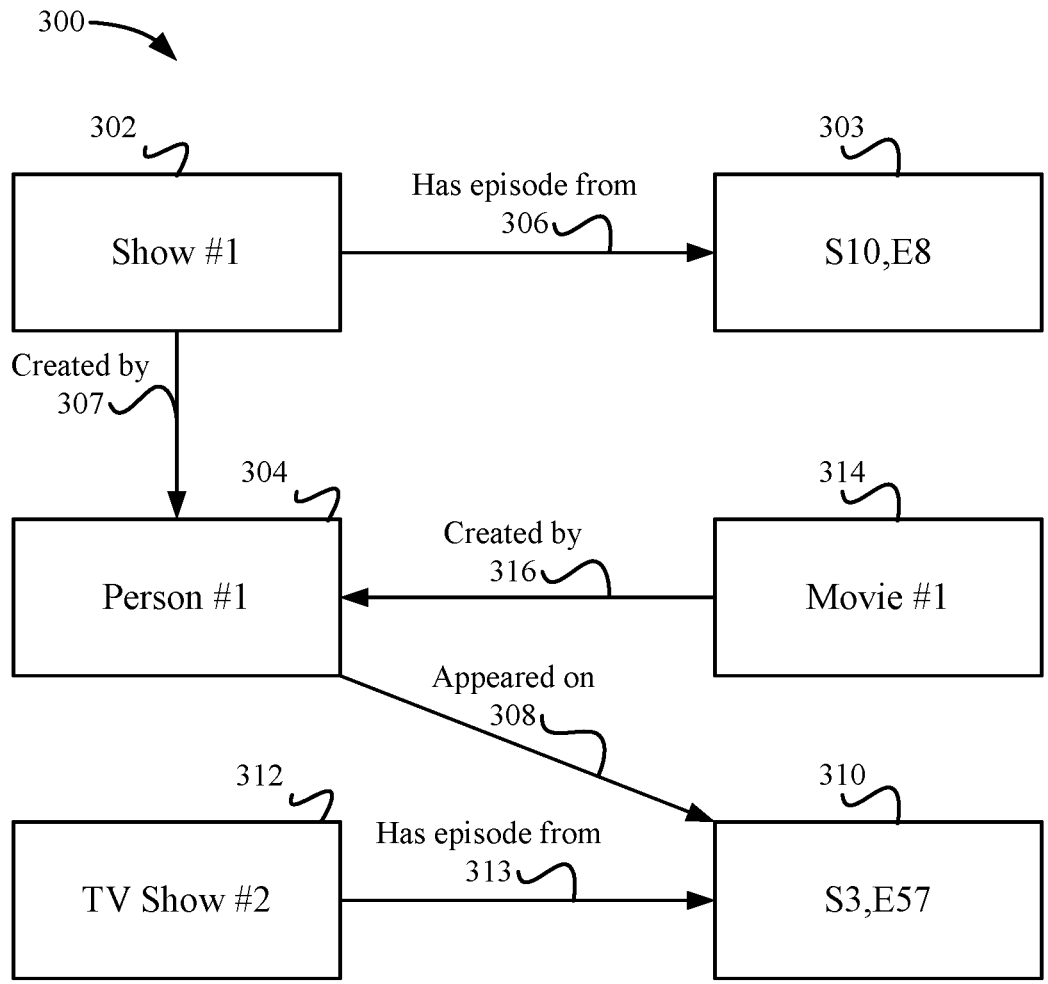
FIG. 3 shows a graph of entities and the relationships between the entities according to one embodiment.

FIG. 3 shows a graph 300 of entities and the relationships between the entities according to one embodiment. In one embodiment, graph 300 may represent any content that may be shown regardless of whether or not that content is available on the video delivery service. Graph 300 includes entities that may not be available on the video delivery service because there may be relationships between entities currently on the video delivery service and entities not currently on the service that may be drawn, or there may be relationships to future availability.

In one embodiment, every entity in graph 300 is unique. For example, at 302, a show #1 is a unique entity, and at 304, person #1 is a unique entity. Graph 300 may be a visualization of a subset of entities and relationships that provides the available possible entities and relationships. For example, a show #1 at 302 may have a relationship 306 of "has an episode from" season 10, episode 8 (S10, E8) at 303. Further, show #1 may have a relationship 307 of "created by" a person #1 that is shown at 304. Then, the person #1 may also have a relationship 308 of "appeared on" a television episode of season 3, episode 57 (S3, E57) of a television show #2 at 310. Television show #2 at 312 also has a relationship 313 of "has episode from" the same episode of S3, E57. Further, a movie #1 at 314 may have a relationship 316 with person #1 in that person #1 created movie #1.

Candidate action generator 210 uses graph 300 to understand what possible entities/relationships could occur whether or not the entity may be available on the video delivery service. Then, candidate action generator 210 uses an entity-to-content matching process that associates certain types of entities in the entity-relationship graph with actual content that can be requested by a user using the video delivery service. For a video title, the video delivery service may have several sources for viewing the video, such as on-demand and linear. Further, different sources might require different entitlements, such as different subscription levels for the video delivery service. Candidate action generator 210 uses the entity-to-content matching process to determine which entities are available for a user to watch. The availability may be availability at a particular point in time, past availability, or future availability.

Figure 4:
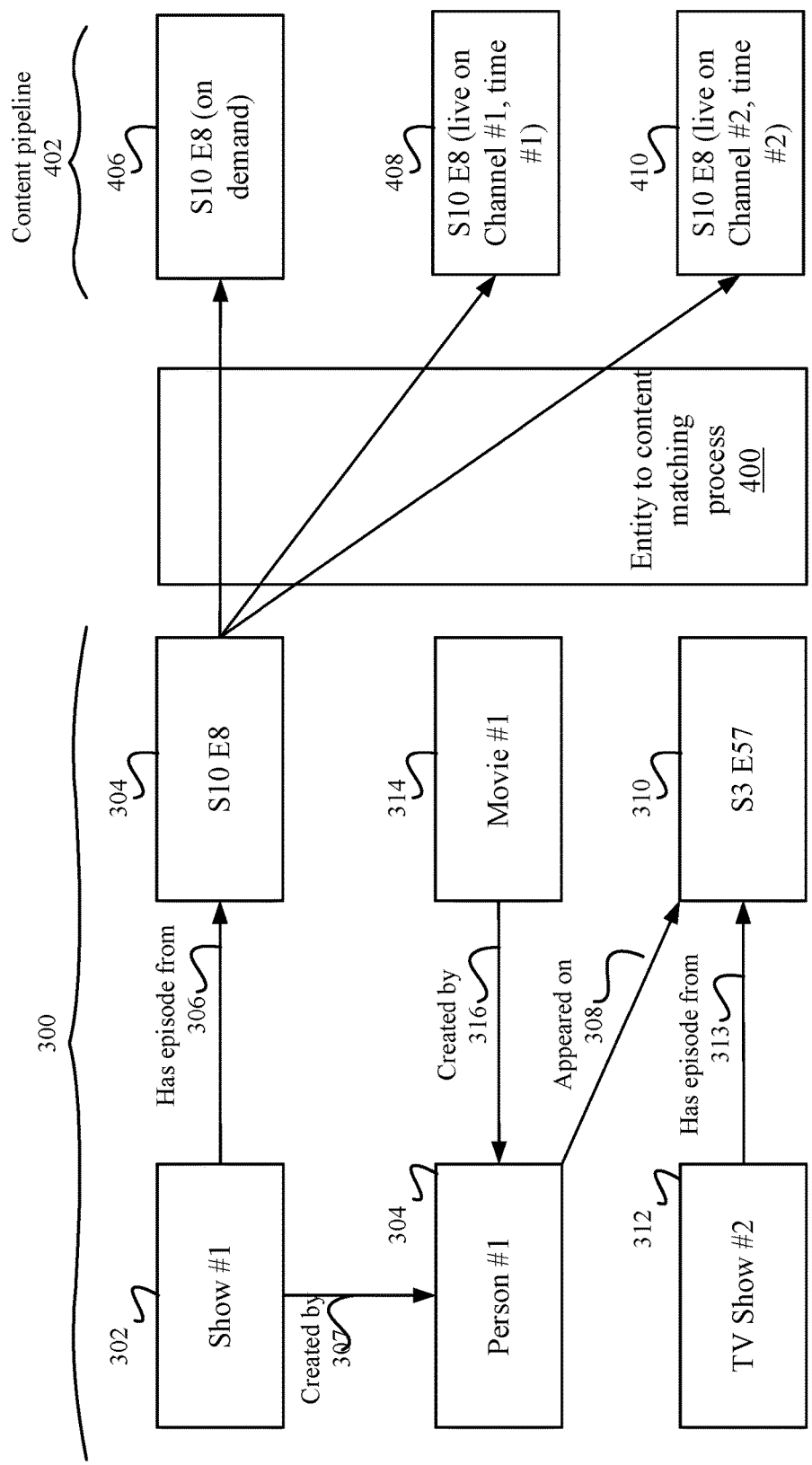
FIG. 4 depicts an example of an entity-to-content matching process according to one embodiment.

FIG. 4 depicts an example of an entity-to-content matching process 400 according to one embodiment. Entity-relationship graph 300 is shown with a content pipeline 402 for the video delivery service. Content pipeline 402 may describe the content that is available at the current time or in the future on the video delivery service. For example, the entity of show #1, which has an episode of season 10, episode 8 is available in content pipeline 402 in different forms. For example, at 406, the episode may be available on-demand. This means a user can currently request the episode at any time. Further, at 408 and 410, the episode may be available via linear delivery, such as the episode is available live on a Channel #1 at a first time #1 at 408 and available live on a Channel #2 at a second time #2 at 410. Candidate action generator 210 determines the entities at 406, 408, and 410 when performing the entity-to-content matching process 400.

Entity-to-content matching process 400 uses current availability during the candidate generation, but future availability is also considered. That is, although some entities may not be currently available, it is possible that these entities may be available in the future on the video delivery service. For example, although television shows, people, etc. are entities that do not have corresponding videos (unlike television episodes or movies), candidate action generator 210 can traverse the relationships in graph 300 and generate actions over these entities if they have relationships to watchable entities that are linked to the available video. For example, if a person #1 appears in a television episode and the video for that television episode is available, the action can be over person #1 and could suggest the video with person #1 in it.

Referring back to FIG. 2, after performing entity-to-content matching process 400, candidate action generator 210 can generate candidate actions for the available entities. Candidate action generator 210 can use the available entities determined by the entity-to-content matching process 400 in addition to the user information from user information storage 206 to determine candidate actions for entities. For example, when a user logs on to the video delivery service, or at other points while the user is using the video delivery service, candidate action generator 210 may generate candidate actions based on the user profile and also the context of the user. The candidate actions may be generated at other times also, such as when the user navigates to a different page of interface 112. The candidate actions may not all be seen by the user, but candidate action generator 210 may determine they could qualify as potential actions to surface to the user.

In one embodiment, candidate action generator 210 can determine entities a user may be interested in and also generate actions for the entities based on what content is available via entity-to-content matching process 400. In one example, candidate action generator 210 may use a machine-learning predictor to generate actions for the entities. In another example, rules may also be used in addition to or in lieu of the machine-learning predictor. In one embodiment, candidate action generator 210 can generate the possible actions for entities based on the user watch behavior on the video delivery service and a real-time user context. For example, candidate action generator 210 may predict whether a user is interested in an entity the user has interacted with before, predict whether a user will take a certain action on an interested entity the user has interacted with before, and/or predict whether a user is interested in a new entity when the user navigates to a page on interface 112. In other embodiments, candidate action generator 210 may determine whether there is an available action for an entity based on the entity's status without taking into account specific user behavior. For example, if a trailer is released for a movie, then the entity/action pair might be watch the trailer for the movie.

In the rules-based predictor system, candidate action generator 210 may use user behavior to predict a user is interested in an entity. For example, candidate action generator 210 predicts a user is interested in a show if the user has completed one episode. The entity-to-content matching process indicates which shows are offered on the video delivery service and also metadata for the shows, such as the actors in the shows, number of episodes, etc. Then, candidate action generator 210 may generate a set of actions for the show, such as watch the latest episode when a new episode (assuming the user is caught up with all released episodes) or watch the next episode if there is a second released episode for the show.

In the machine-learning predictor system, candidate action generator 210 may predict whether a user is interested in different types of entities, such as shows, movies, genres, actors, directors, networks, etc. For example, candidate action generator 210 may use the user behavior and information for the available entities to predict whether a user would re-engage with these entities from user behavior on the video delivery service, such as video views and also metadata for the entities. Also, with the help of the entity/relationship graph, connections between a user and an entity that have not been engaged by the user can be drawn. Based on connections, candidate action generator 210 may recommend new entities and appropriate associated actions (Follow "Actor A", Follow "Election 2016").

The machine-learning predictor may first be trained using historical user behavior (e.g., user actions, such as browse behavior, watch behavior, and search behavior) on the video delivery service and the information for the available entities. This trains a model to predict whether a user would re-engage with an entity based on the user's short-term or long-term engagement with related entities. These entities may include shows, which may be television shows, manually-followed entities, and other entities. If the predicted probability of re-engaging with an entity is higher than a predefined threshold, then candidate action generator 210 may consider this entity as an entity the user is interested in.

In one embodiment, candidate action generator 210 selects a first set of entities that the user has engaged within a time period (e.g. the last 3 months). Candidate action generator 210 may also determine whether the probability of the user re-engaging with the entity is above a threshold. Also, candidate action generator 210 selects a second set of entities the user has not engaged with (e.g., with the last 3 months or ever), but are highly related to what the has engaged before. Candidate action generator 210 determines the second set of entities dynamically, based on a context for the user, such as the time of the day, geo-location, if the user has just finished watching a show, or other contextual information.

After selecting the entities, candidate action generator 210 generates action candidates for the predicted entities. In one embodiment, all possible actions are applied, such as the actions are ones that can be applied to the entities at the current time or a future time. In another embodiment, candidate action generator 210 predicts what actions the user might use to re-engage with the entity. For example, watch actions may be associated with the show that has available episodes to watch for a specific user. For manually-followed entities, the action may be watch the entity from the beginning. Other actions may be recommended for entities that the user may be interested in, such as follow an actor that is associated with a show the user watched. Candidate action generator 210 may then output the predicted possible actions for the entities. It is noted that entities may have multiple actions that could be applied. The actions output by candidate action generator 210 are received at action ranker 212 for ranking.

Action Ranking

After generating candidate actions over entities, an action ranker 212 ranks the candidate actions against each other. Action ranker 212 may rank the actions themselves against each other instead of ranking content against content. That is, the action of watching a television episode may be ranked against the action of watching a movie, instead of ranking the television show vs. the movie. The ranking of actions allows action ranker 212 to factor in user context effectively and capture habits. This is different from ranking a movie against a television show, and requires a different type of predictor to perform the ranking. For example, action ranker 212 may recommend an action such that the probability of the user selecting the action in the current context is maximized. Further, action ranker 212 may recommend an action such that the downstream value of the user taking the action is maximized. The downstream value may be some value of the user taking this action at a later time. This value may be quantified on the video delivery service. For example, not only does the video delivery service want to provide an engaging experience to a user currently using the video delivery service, the video delivery service would like to provide a content strategy for promoting its content organically in the future. For example, an action the user might most likely take is watching a commonly available television show. However, an exclusively available critically acclaimed show might be slightly lower in the probability of the user currently taking that action, but would have a much higher downstream value in that the user might continue to view this more valuable show later. In this case, the critically acclaimed show might be ranked higher. The actions also go beyond suggesting that a user watch a video as non-watching actions are included in the ranking process with watch actions.

Figure 5A:
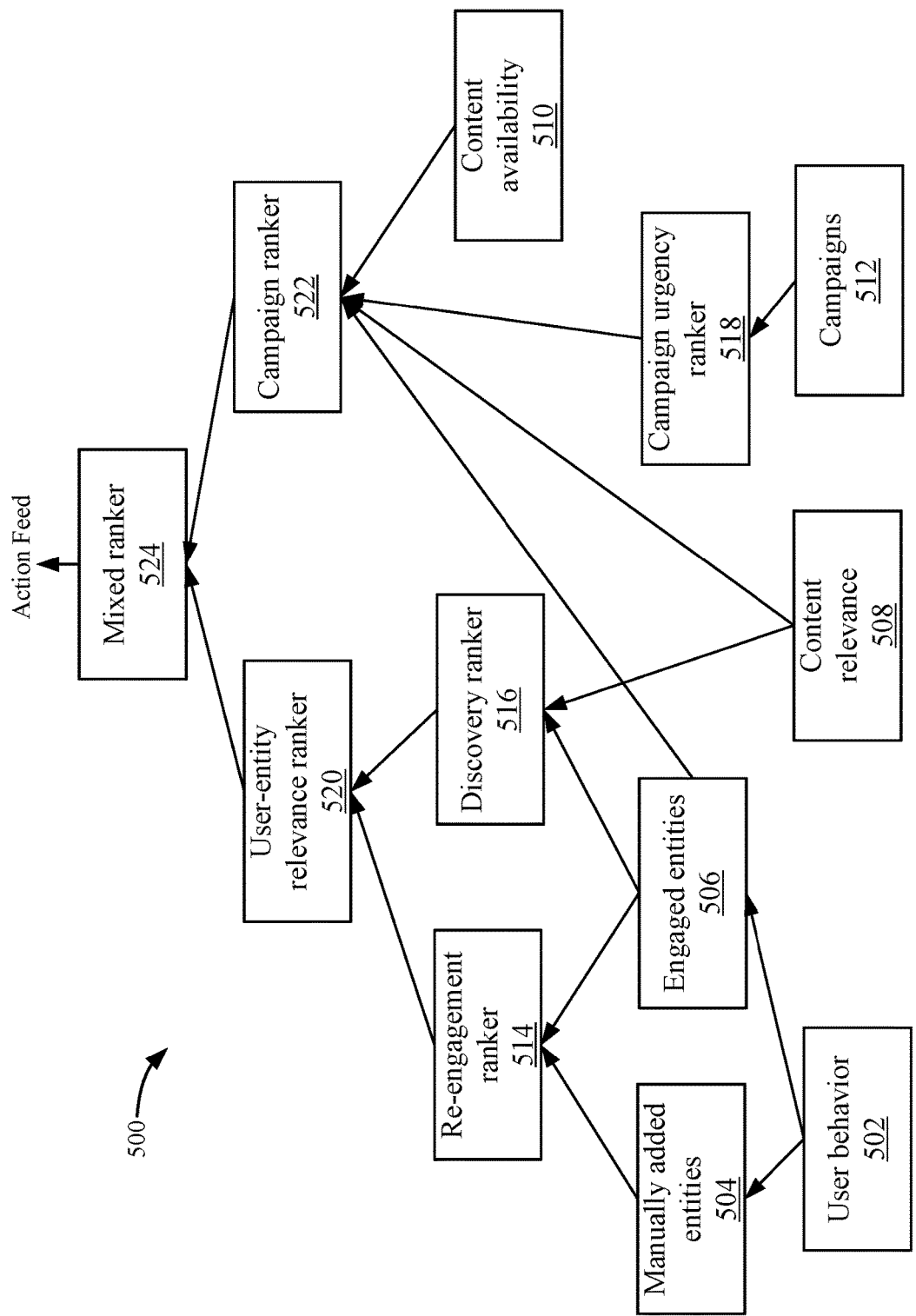
FIG. 5A depicts an example of the ranking process used by an action ranker according to one embodiment.

FIG. 5A depicts an example of the ranking process 500 used by action ranker 212 according to one embodiment.

Action ranker 212 may include multiple rankers that can rank entities. The process of ranking may take into account information from entity/relationship storage 204, user information storage 206, and campaign storage 208. This information is used to generate candidate actions for entities as was described above. The candidate generation process will not be described again, but the specific information used to generate candidates for each ranker is described. For example, user information storage 206 may include user behavior, manually-added entities, and engaged entities shown at 502, 504, and 506, respectively. As discussed above, the user behaviors in the past include browse, search, watch, follow, and save behaviors. The user behavior is used to determine manually-added entities 504 and engaged entities 506. Manually-added entities 504 are those entities that a user has manually added, followed, or saved. Manually-added entities 504 may be explicitly added by the user. Engaged entities 506 may be those entities that a user has watched, searched for, or browsed over. The engaged entities may be implicitly expressed by the user.

Content relevance at 508 stores relevance between two pieces of content or two entities. This is used to determine if a user is interested in one media program, the user might be interested in another media program.

At 510, the content availability is the availability of content including when the content premieres, expires, and what time slot that live content is going to be provided. The content availability is determined from the entity/relationship storage 204. The content availability may be provided for all combinations of geo-location and video delivery service package types. That is, some content may be available in certain locations and some content may be available in different packages offered by the video delivery service.

At 512, the campaign information may be retrieved from campaign storage 208. The campaign information may be information on campaigns that are being run relating to a certain entity. The campaign information includes the start and end dates, impression goals and current progress, and also actions that can be taken for the entity that is the subject for the campaign.

Action ranker 212 receives the candidate actions for the information retrieved from storage 502-512 at the different rankers. The rankers are configured to receive actions for entities and automatically generate a probability a user would select each action. Because of the nature of the user using the video delivery service and navigating to different areas of interface 112, the rankers need to be used to automatically generate the rankings so the actions can be surfaced to a user in real-time. An example of a ranker that can be used will be described in more detail below.

A re-engagement ranker 514 receives the manually-added entities 504 and engaged entities 506. Then, re-engagement ranker 514 ranks actions for the entities for which the user has knowledge. This ranks the probability that the user would select the action for an entity that the user has explicitly added or taken action on before.

A discovery ranker 516 receives the engaged entities and content relevance information. Discover ranker 516 ranks actions for the entities for which the user does not have any knowledge. For example, the engaged entities are used to determine relevant entities that are related to the engaged entities. Discovery ranker 516 discovers the entities based on entity/relationship graph 300.

A campaign urgency ranker 518 receives the campaign information and can rank the actions for the campaigns. In one embodiment, campaign urgency ranker 518 may rank an action for a campaign based on an urgency score for the campaign. The urgency may be how important it is to receive an impression for the entity at the particular point in time. The higher the urgency score is, the more urgent the campaign is. The score may be computed based on the campaign goals and the current progress. For example, the campaign goal may be 1 million impressions in 1 week, and the current progress may be 100,000 impressions after 3 days. This may make the importance of receiving an impression for this campaign more urgent than if 800,000 impressions had already been received.

The output of re-engagement ranker 514 and discovery ranker 516 is input into a user entity relevance ranker 520. Additionally, user entity relevance ranker 520 receives the content availability. Then, user entity relevance ranker 520 generates a unified ranking of the inputs with each of the entities' actions being ranked based on a probability the user would select each action. That is, the explicit actions and implicit actions are ranked against each other. In one embodiment, the explicit actions and implicit actions can be combined using different methods. For example, re-engagement ranker 514 and discovery ranker 516 output probabilities within the same range (e.g., between a range of [0,1]) and thus the actions are comparable. In other examples, the probabilities from one of the rankers may be normalized such that the probabilities for both rankers are within the same range after normalization. Once the probabilities are in the same range, user entity relevance ranker 520 can unify the ranking in a descending order according to the probabilities output by the previous rankers (e.g., re-engagement ranker 514 and discovery ranker 516). Another way of unifying could use a pre-specified ratio of re-engagement vs. discovery to merge the ranked list from the previous rankers according to the ratio. For example, with a 3:1 ratio, user entity relevance ranker 520 selects the three highest ranked actions from re-engagement ranker 514, and then selects the single (1) highest ranked action from discovery ranker 516, and then selects the next three highest ranked actions from re-engagement ranker 514, so on. Other considerations may also be used to unify the ranking, such as user entity relevance ranker 520 can promote an action based on some context, such as special treatment can be made when user entity relevance ranker 520 looks at the user's behavior, e.g. when the user has finished one show, then the ratio of discovery item can be increased.

A campaign ranker 522 receives the campaign urgency ranking along with the content relevance and content availability. Then, campaign ranker 522 may rank all campaigns with relevance between the content and the campaign with the urgency considered. For example, the relevance of the content for the campaign being promoted along with the content availability is used to rank actions for all the campaigns.

Then, a mixed ranker 524 receives the user entity relevance ranking and the campaign ranking. Mixed ranker 524 can rank a final list of recommended entities with associated actions from campaign ranker 522 and user entity relevance ranker 520. Mixed ranker 524 may unify the rankings from campaign ranker 522 and user entity relevance ranker 520 in a similar way as described with respect to user-entity relevance ranker 520. For example, campaign ranker 522 and user entity relevance ranker 520 may output probabilities for actions within the same range of [0,1] that are ranked together, or use any of the other methods described.

Each ranker discussed above may use a predictor to rank actions. Each different predictor may rank a different set of actions, but may use similar a ranking process. The ranking process will be described with respect to action ranker 212, but may be used by each ranker described in FIG. 5A.

In one embodiment, action ranker 212 may use a machine-learning predictor. Also, a rules-based predictor may also be used in addition to or in lieu of the machine-learning algorithm. For the rules-based predictor, action ranker 212 may rank the actions using historical user behavior on the video delivery service. The historical user behavior data may be associated with the user, and/or be associated with other users on the video delivery service. That is, data may be aggregated for many users using the video delivery service and used to predict a ranking for the actions for entities. Action ranker 212 then applies rules to the real-time context to rank the actions for the entities.

For the machine learning predictor, action ranker 212 may be trained with previous user behaviors from the past. Each behavior can be interpreted as an action on a specific entity. All the actions, associated with a context when the user took the action, form the positive samples. Negative samples are those at the same context that were eligible to be taken by the user, but were not taken by the user. The training process tries to find the predictor with the best discriminative power to differentiate positive samples from negative ones, using a prediction process, such as multi-layer neural networks, decision tree or logistic regression. As a result, candidate action generator 210 outputs a value for a specific action, which is the predicted probability that the action would be taken by the user. There might be more than one action eligible for a user to take on an entity, but action ranker 212 may only output the action with highest predicted probability for each entity. However, action ranker 212 can also output multiple actions for entity.

In one example, the trained predictor includes a function f(u, e, a, c), which outputs a value between a range (e.g., [0,1]), where u is the user (including information about the user's past behaviors up to a certain time point), e is the entity, a is an action, and c is the real-time context (time of day, geo-location (e.g., location information), device being used, seasonality, day of the week, current status of the user (e.g., just finished a show episode), etc.). Action ranker 212 retrieves the information that is needed or receives the information dynamically in real-time. The lower the value output by the predictor, the less likely the user is predicted to take the action, and the higher the value, the more likely the user is predicted to take the action.

When given a set of pairs of form (e, a) for a certain user u in the context c, the predictor evaluates all values of f(u, e, a, c). Then, action ranker 212 ranks all the (e, a) pairs according to the evaluated values. For each entity e, only one (e, a) pair may be retained in the final results, namely, only the most probable action for an entity is retained. However, multiple actions may be used. In addition to relevance, a user's negative feedback may also be used by action ranker 212 to adjust the ranking.

In one embodiment, the inputs for the entity, user, or context to the predictor may be based on any combination of:
Attributes of the entity (e).
Availability change for the entity (e).
The user's context (c).
The user's affinity to the entity (u).
The user's recent behaviors (u).
The user's habits on the video delivery service (u).

The attributes of the entity may include information about a video, such as when a show is releasing episodes, when the last episode was released, what episode the user last watched, etc. The availability change may be if any availability on the video delivery service might change, such as the episode or movie may be scheduled to be removed from the video delivery service. The user's context is based on various characteristics for the user, such as the device being used to access the video delivery service, the time of the day, the day of the week, etc. The user's affinity to the entity may be how much the user likes the entity, such as whether the user has watched a related video, liked the director or other director's movies, liked the show, etc. The user's recent behaviors may be what actions a user has recently taken on the video delivery service, such as manually added/followed a video, watched a video, etc. The user's habits may be actions a user typically takes on the video delivery service.

Action ranker 212 may generate probabilities that a user will take an action for an entity by ranking the actions for entities against each other. For an entity that the user has not previously performed an action with, candidate action generator 210 may infer the probability by the relevance between this entity/action and entities the user has taken actions on. For an entity the user has performed actions on before, action ranker 212 may predict the probability based on the user's watch behavior, watch patterns, search behaviors, and availability of the entity.

Action ranker 212 may also use the effective time to determine how likely the user will take the action, such as it may be more likely that a user will re-engage with an entity to perform an action if the user more recently performed that action on the same entity. The effective time may be dependent on the type of entity. For example, effective time may be defined as a function of last engaged time or availability change time (new arrival, expiring soon, season premiere, and a manually-saved time or followed time for the user). The effective time may also be based on a number of unseen episodes for the specific user. In one example, if the user's favorite show or celebrity has new arrivals in the video delivery service (e.g., a new episode or movie), the user saved or watched half-way a show/movie recently, the user has been binge watching a library show, action ranker 212 may generate a high probability for the entity/action pair.

Action ranker 212 may use the context to determine probabilities that the user will take the action on the entity, such as the user may use a certain device to access the service at a certain time. The context may be the user's location, time, device that the user is currently using, and the subscription package for the video delivery service.

Conventionally, when ranking content against each other, the system is concerned with whether the user engages with the content. However, ranking actions takes the prediction one step further, not only is action ranker 212 concerned about the content the user would engage with, but also how the user would engage with the content. Therefore, in one embodiment, the predictor can explicitly tell the user the suggested way of engagement with the entity.

Figure 5B:
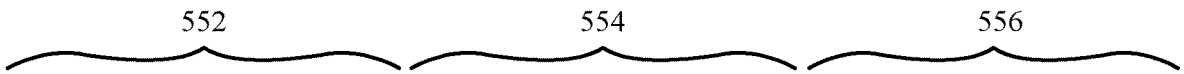
FIG. 5B depicts a table of entities and actions that have been ranked according to one embodiment.

The output of action ranker 212 may be probabilities for entities and each associated action pairs. FIG. 5B depicts a table 550 of entities and actions that have been ranked according to one embodiment. Table 550 may be stored in a database and accessed by action feed generator 108 to generate a list of actions for entities for the action feed. A column 552 lists the entities that were selected by candidate action generator 210 and column 554 lists the actions that were selected for the entities by candidate action generator 210. Column 556 lists the probabilities generated by action ranker 212. Each show/action entity may be a row in the table although this is not shown graphically. The probabilities indicate a probability the user would take an action over another action. The probabilities may be based on all actions in the tables. For example, for the action Watch next episode for Show #1, it is 90% probable the user would take this action over all other actions (or a group of actions) in the table.

Action Feed Filtering

The output of mixed ranker 524 is an action feed that includes a ranked list of actions on entities. This may be considered an action feed 110 that can be used by the video delivery service. For example, action feed 110 may be surfaced to various interface positions at a client 104. Additionally, action feed 110 may be filtered to provide a drill-down into different categories of actions. For example, the action feed may be provided on a homepage for a user when the user logs into the video delivery service. Also, action feed 110 may be filtered to only show actions for entities that are new to the user; that is, entities that a user has explicitly watched or added before and does not include campaigns.

Figure 6A:
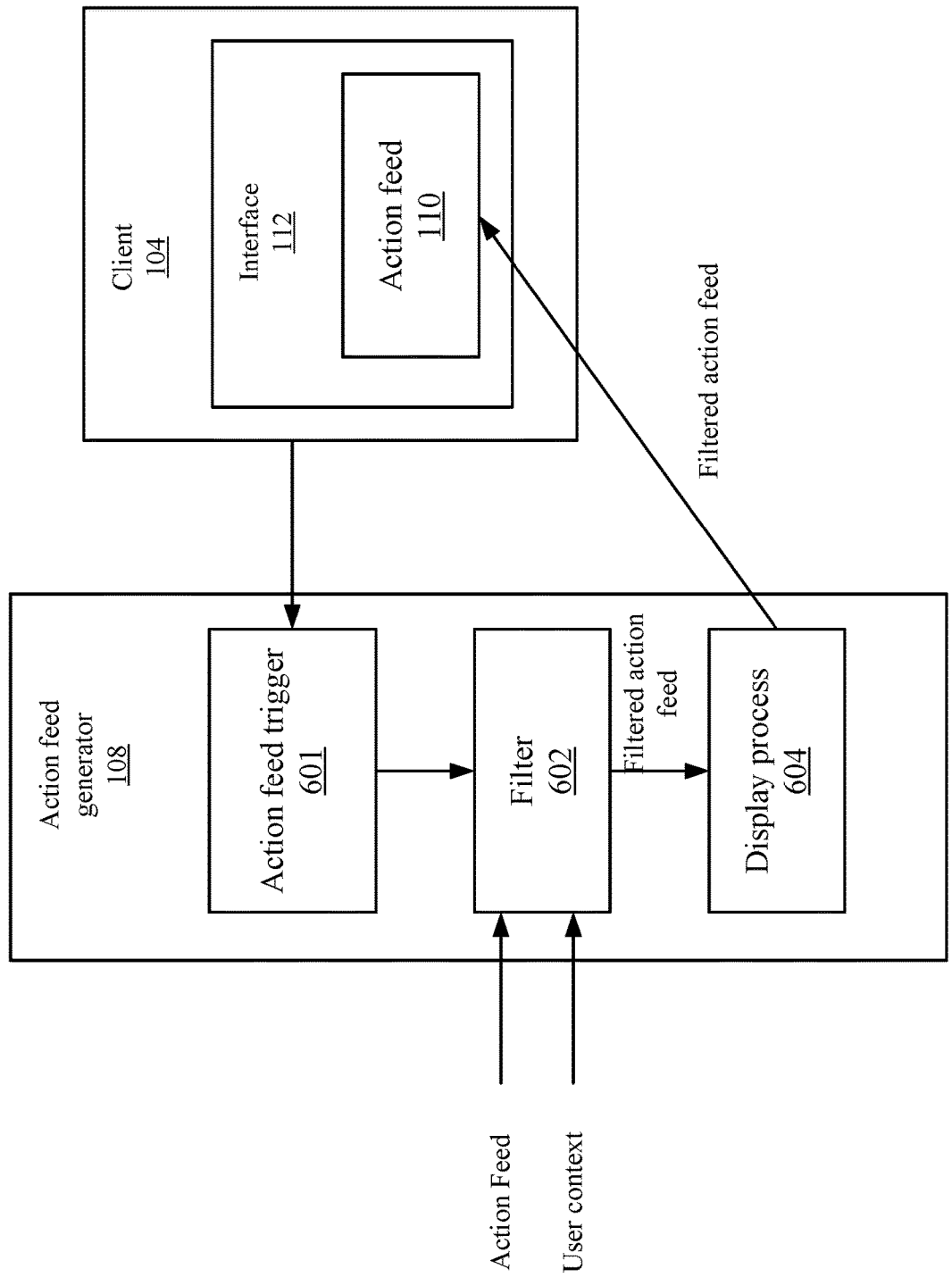
FIG. 6A depicts a more detailed example of the action feed generator for displaying an action feed according to one embodiment.

FIG. 6A depicts a more detailed example of action feed generator 108 for displaying action feed 110 according to one embodiment. An action feed trigger 601 receives a real-time indication that the action feed should be displayed on interface 112. For example, the trigger may be that a user has logged onto the video delivery service. Other triggers include the user browsing to different pages, hubs, or sections of user interface 112.

A filter 602 receives action feed 110 from mixed ranker 524 when the trigger is detected. Filter 602 may also receive real-time information for a user, such as a user's context. For example, the context may include the page of an interface the user is currently viewing, current actions the user is performing, or other user information. The user context may be received from the trigger, from client 104, or derived (e.g., a time of day).

Filter 602 may then filter the action feed to select a portion of the actions based on the user's context. In one embodiment, filtering may remove some actions that are higher ranked than others based on the filter criteria. Although this type of filtering is described in other embodiments, the action feed may select the top X actions from action feed 110. In one example, only one action is displayed per entity. In this example, X is a number equal to or less than the number of entities in the action feed. In another example, multiple actions may be displayed for one or more entities. In the second example, X is a number equal to or less than the number of actions in the action feed.

Figure 6B:
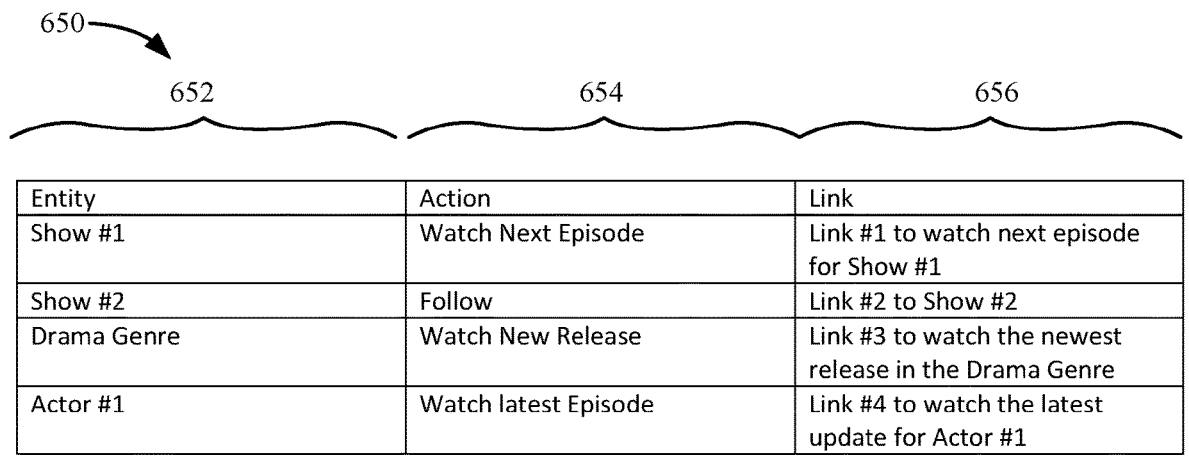
FIG. 6B depicts an example of a table that is used to store the selected actions according to one embodiment.

Filter 602 may then generate a table that includes the selected action feed entities and actions. FIG. 6B depicts an example of a table 650 that is used to store the selected actions according to one embodiment. As shown, table 650 includes the selected entities in a column 652 and also the actions in a column 654. Because different actions are possible, table 650 includes a link to the selected action/ entity combination in a column 656. For example, different actions may point to different episodes of a show. Depending on the action, the link points to the correct entity, such as the latest episode for a caught up show or the first episode for a library show.

In the example in table 650, the actions are listed from highest probability to the lowest probability. For show #1, a link #1 includes information such that the next episode for show #1 that a user still has not watched is played. This link may be hardcoded to a specific episode or the next episode may be determined dynamically when link #1 is selected. For show #2, a link #2 causes show #2 to be followed. For the Drama genre, a link #3 causes the newest release in the drama genre to be played. For Actor #1, a link #4 causes the latest update (e.g., an episode including the Actor #1) to be played.

Referring back to FIG. 6A, whatever actions that are selected by filter 602 are then provided to display process 604. Display process 604 can then dynamically display the action feed whether it is filtered or not on interface 112 of client 104. Display process 604 may dynamically display action feed 110 while the user navigates to different areas of interface 112 and different pages are displayed.

In one example, action feed 110 can be displayed on a homepage for the user in interface 112. The homepage may be the first page of an application that a user sees when the user logs into the video delivery service. In one embodiment, this action feed is displayed in an area, such as the masthead or a prominent location on interface 112. Additionally, action feed 110 may also be provided on different trays, hubs, or pages of interface 112. For example, different filtered action feeds can be provided in different pages. Examples of pages include a new-for-you category that shows only actions that are new to the user. Display process 604 may also display slices of the action feed as the user browses for something specific. For example, if the user navigates to a movies page on interface 112, then the action feed can be filtered down to only movie actions. Display process 604 can display these movie actions on the current page of the user.

Display process 604 may also display an action feed for continuous play. For example, when a user reaches the end of playback of a video, action feed trigger 601 receives the notification that playback is ending, and display process 604 can select the next best action for the user to display on interface 112. This action could keep the user watching without any explicit effort by the user and also suggest other alternatives or pivots for the user to view. The pivots can be categorized similarly to the approach that generated the actions for the homepage. When performing continuous play, the prior action is considered when generating and ranking the actions. If the user has been viewing a lot of episodes in a row of a television show, then the action should be continue watching that television show as a top-ranked suggested action.

Notifications may also be used when a top action is very relevant and potentially time-sensitive, such as watching a live sporting event. Display process 604 may then raise a notification to the user in interface 112. This may be in interface 112 and may also be through the operating system such that this is a global notification for the user.

Interface and Action Feed Example

Figure 7:
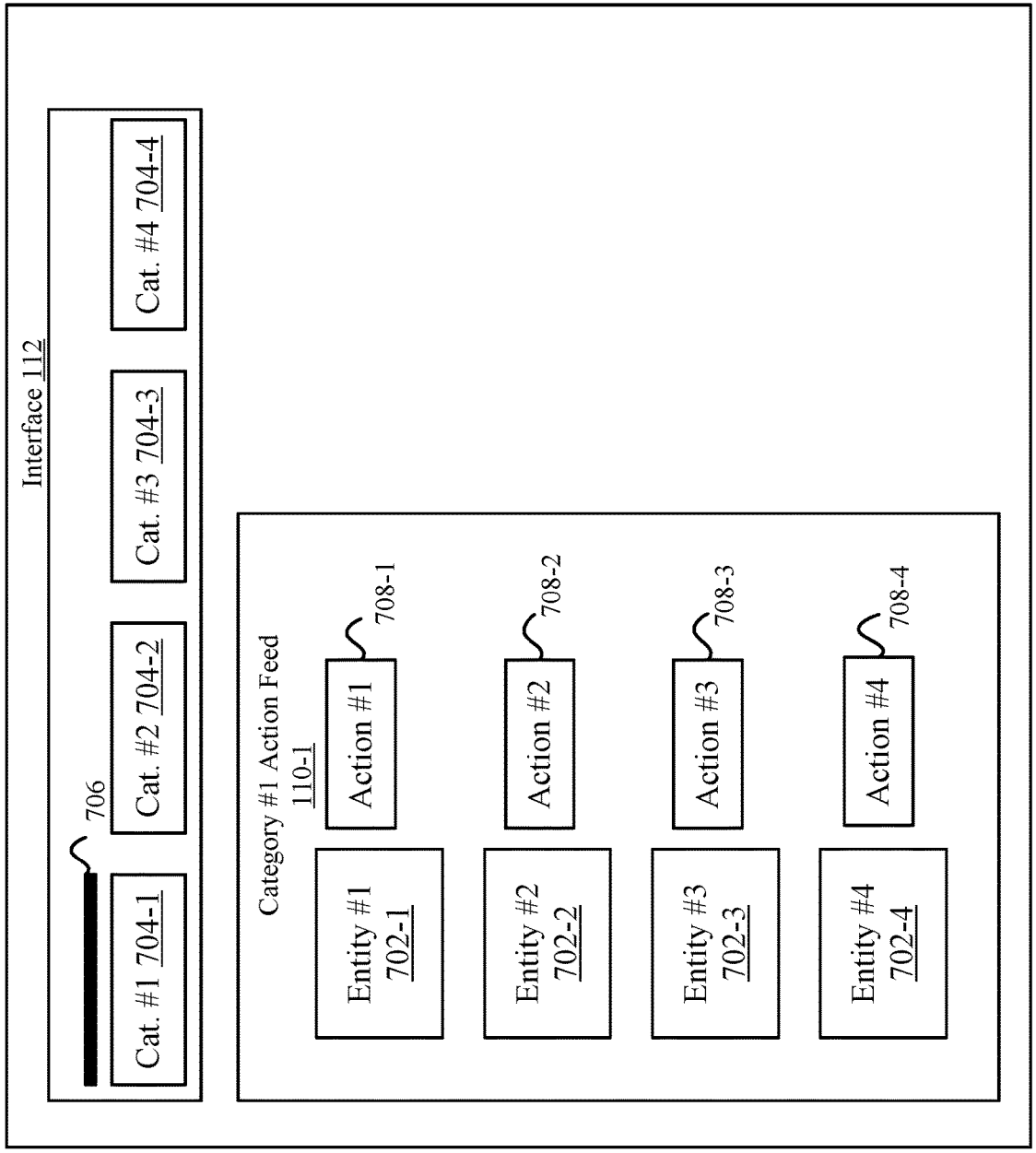
FIG. 7 depicts an example of the action feed being displayed on a user interface of a client according to one embodiment.

FIG. 7 depicts an example of action feed 110-1 being displayed on a user interface 112 of client 104 according to one embodiment. Although this user interface is shown, it will be understood that users may navigate to other areas of an application being displayed in the user interface to display different versions of the action feed. In this version, interface 112 may display different categories 704-1-704-4 of videos from the video delivery service's video library. For example, different categories may include a lineup that shows top suggested actions for the user, a television category, a movies category, a sports category, and a networks category. Each category includes its own action feed. Although these categories are listed, other categories may also be appreciated.

In one embodiment, a selection of category #1 is received using a selector 706. The selection causes display of action feed 110-1, which includes entities #1-#4 702-1-702-4 arranged in a predicted order for actions 708-1-708-4 for the entities. For example, at are shown in an order from top to bottom. For example, entity 702-1 has the highest probability the user will perform the associated action #1 708-1, entity 702-2 has the next highest probability the user will perform the associated action #1 708-2, etc. Also, other entities with associated actions may also be included in action feed 110 after action #4 708-4, but are not shown.

When entities are shows, the shows may include a different number of available or unwatched episodes. The associated action may suggest an episode that has the highest probability the user might want to watch next. Also, live videos may be blended with on demand videos in the same action feed 110-1. The ranking of actions allows the system to rank the live videos with the on demand videos and provide a unified interface with both types of videos.

In one embodiment, action feed generator 108 uses table 550 shown in FIG. 5B to dynamically generate action feed 110-1 in interface 112. For example, action feed generator 108 determines how many spots in the category are available for action feed 110-1. The number of spots may depend on the category or on the number of entities and associated probabilities in table 550. For example, action feed generator 108 may select each unique entity that is included in table 550. Then, action feed generator 108 selects the action for each unique entity that has the highest probability. Action feed generator 108 may also use other methods to select the entities, such as selecting X number of entities that have actions above a threshold.

Once selecting the entities, action feed generator 108 uses the links to the content in table 650 of FIG. 6B to generate action feed 110. For example, the links are sent to client 104 and when an entity is selected, client 104 uses the link to request the associated entity with the action. For example, the link not only specifies the entity, but also the action. Link #1, #3, #4 will direct a user to a page where a video is being played. Link #2 will direct a user to a page describing details of the show and a message indicating the future updates of the show will be displayed in the user's action feed 110.

Method Flows

Figure 8:
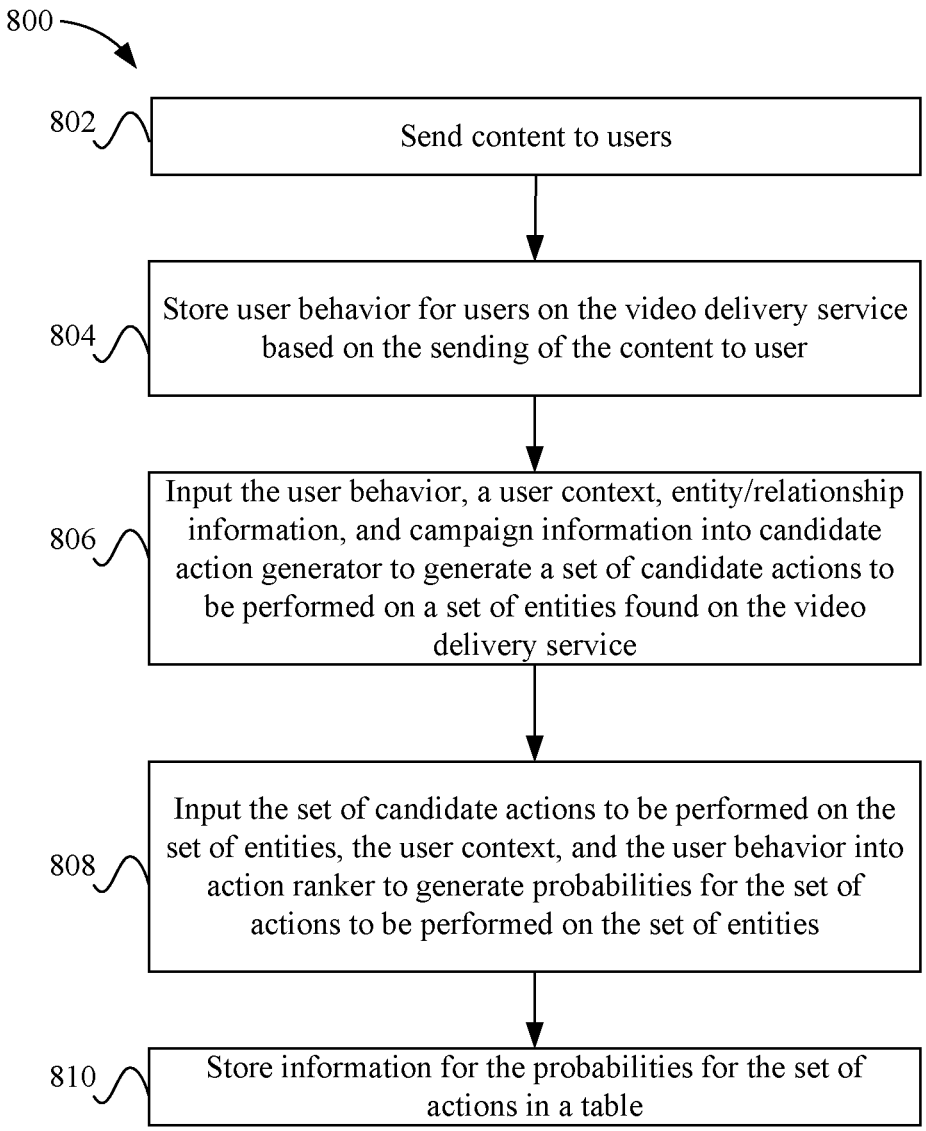
FIG. 8 depicts a simplified flowchart of a method for generating an action feed according to one embodiment.

FIG. 8 depicts a simplified flowchart 800 of a method for generating an action feed 110 according to one embodiment. At 802, action feed generator 108 sends content to users. At 804, action feed generator 108 stores user behavior on the video delivery service based on the sending of the content to user. The user behavior includes actions taken by the users (or not taken) on the video delivery service.

Then, for each user, at 806, action feed generator 108 inputs the user behavior, a user context, entity/relationship information, and campaign information into candidate action generator 210 to generate a set of candidate actions to be performed on a set of entities found on the video delivery service. At 808, action feed generator 108 inputs the set of candidate actions to be performed on the set of entities, the user context, and the user behavior into action ranker 212 to generate probabilities for the set of actions to be performed on the set of entities. As discussed above, the probability for an action indicates the probability the user would select that action when compared against other actions in the set of actions to be performed on entities. At 810, information for the probabilities for the set of actions is stored in a table.

Figure 9:
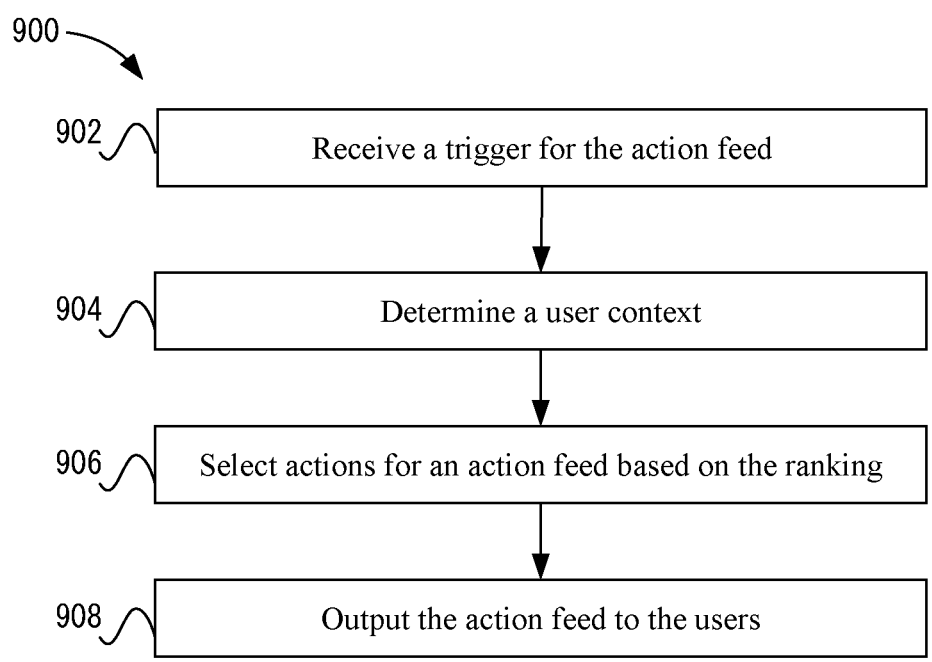
FIG. 9 depicts a simplified flowchart of a method for displaying the action feed according to one embodiment.

After generating the ranked action feed, FIG. 9 depicts a simplified flowchart 900 of a method for displaying action feed 110 according to one embodiment. At 902, action feed generator 108 receives a trigger for the action feed. The trigger indicates the action feed should be generated.

At 904, action feed generator 108 determines a user context. The user context may be based on real-time information for the user. At 906, action feed generator 108 selects actions for an action feed 110 based on the ranking. For example, depending on the context, action feed generator 108 applies different filters to action feed 110. At 908, action feed generator 108 outputs action feed 110 to the users.

Figure 10:
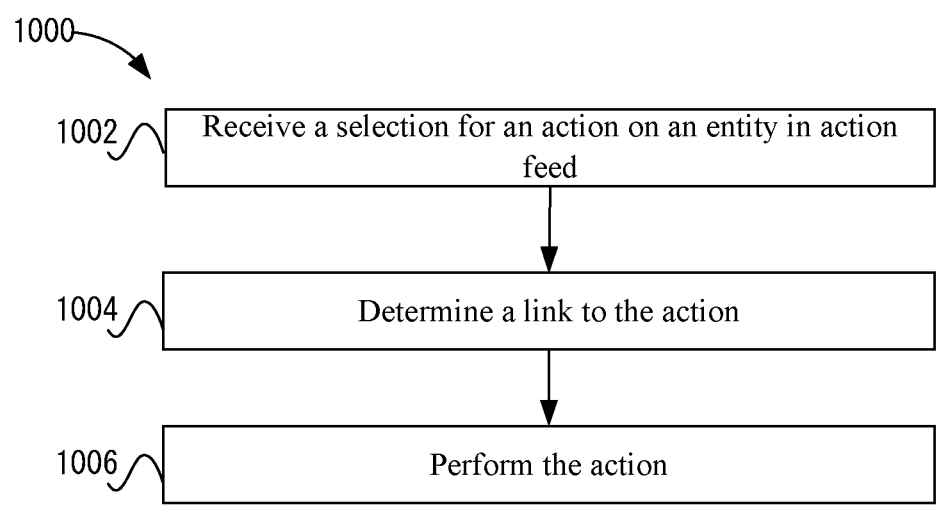
FIG. 10 depicts a simplified flowchart of a method for responding to a selection of an action in the action feed according to one embodiment.

FIG. 10 depicts a simplified flowchart 1000 of a method for responding to a selection of an action in action feed 110 according to one embodiment. At 1002, action feed generator 108 receives a selection for an action on an entity in action feed 110. At 1004, action feed generator 108 determines a link to the action. For example, client device 104 may send the link to the action in a request. The link may have been associated with the icon on the action feed that was selected. In other examples, action feed generator 108 determines the link once the request for the action is received for table 650 in FIG. 6B. At 1006, action feed generator 108 performs the action. For example, if the action is watch the next episode of a show, then action feed generator 108 causes the next episode of the show to be played on video delivery system 106.

Feedback

When actions are provided to a user, feedback may be received and used to improve the generation of future action feeds. Action feed generator 108 receives the actions that a user takes. The feedback may also be negative feedback in that the user did not take an action that was suggested. Positive feedback may be when the user actually takes an action. The positive feedback may be binary in that the user took an action or did not take an action, or it can be weighted by downstream value/intensity of engagement. For example, the user may take an action to start viewing a television show but then stop viewing the television show a few minutes later in contrast to the user viewing every single episode of the season. Also, the negative feedback is when the user ignores a recommended action or through explicit feedback such as the user selects a dismiss or not interested input. The feedback information is then provided in the user behavior database for future use in generating the action feed.

Conclusion

Accordingly, the action feed can be used to suggest actions for a user. This is different from suggesting just videos. The actions take the recommendations a step further to suggest what the user could do with the entities. Additionally, the ranking process ranks the actions against each other. This allows the recommendations to use user behavior with more granularity to provide more accurate recommendations.

Further, the actions allow the entities to be ranked from multiple sources, such as linear video in addition to on-demand video. Additionally, campaigns can also be integrated into the ranking or the action feed.

The detection of patterns in historical user behavior can then be used to more highly rank actions that fit the user's behavior. As a result, fewer actions over entities can be recommended, as opposed to the entity itself that the video delivery service knows is related to a video that the user has previously watched. This also allows context to be provided, such as if the user watches news in the morning, then actions over the news content can be provided to the user.

System Overview

Figure 11:
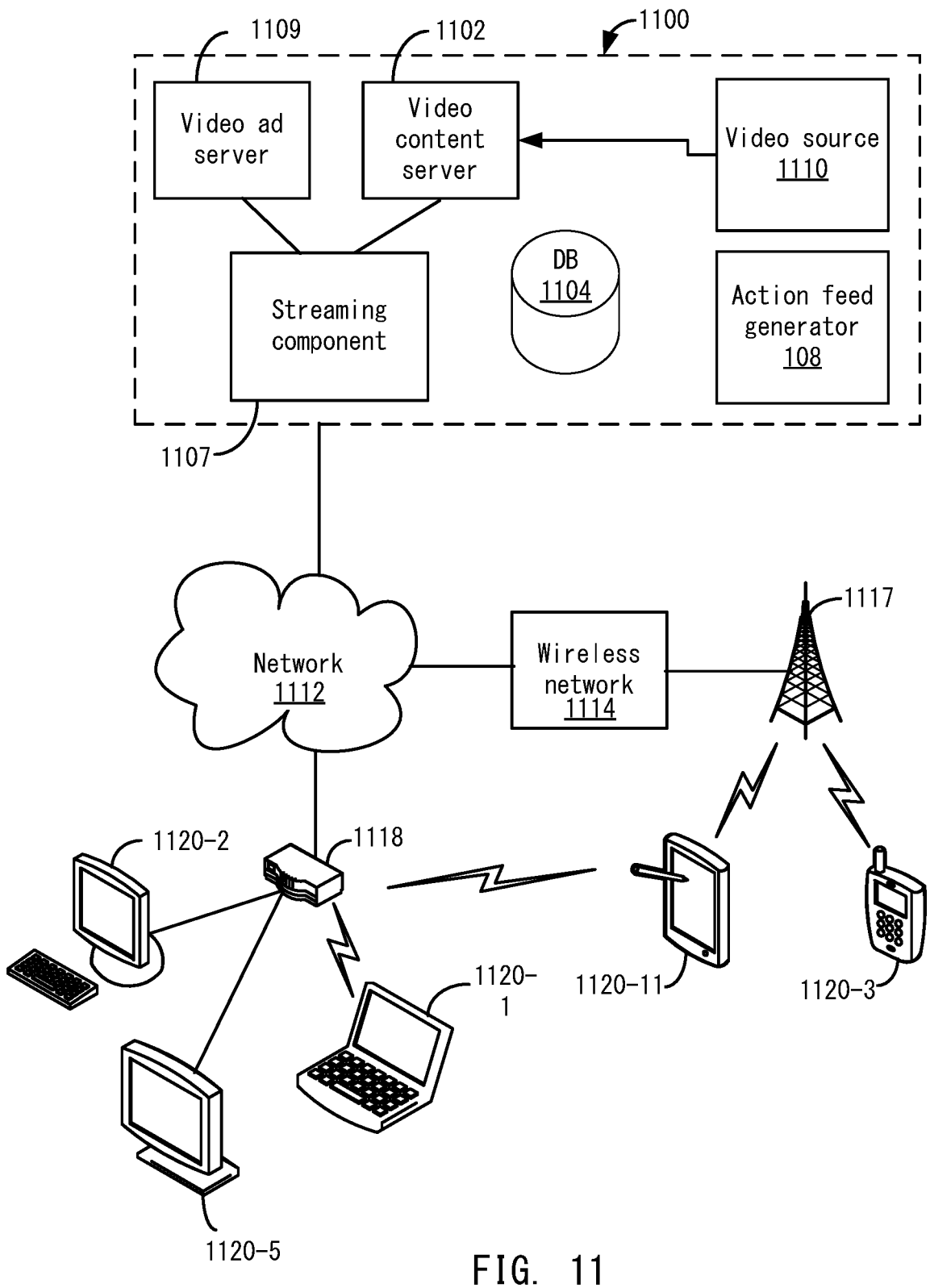
FIG. 11 depicts a video streaming system in communication with multiple client devices via one or more communication networks according to one embodiment.

Features and aspects as disclosed herein may be implemented in conjunction with a video streaming system 1100 in communication with multiple client devices via one or more communication networks as shown in FIG. 11. Aspects of the video streaming system 1100 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 1100, video data may be obtained from one or more sources for example, from a video source 1110, for use as input to a video content server 1102. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 1100 may include one or more computer servers or modules 1102, 1109, and/or 1107 distributed over one or more computers. Each server 1102, 1109, 1107 may include, or may be operatively coupled to, one or more data stores 1104, for example databases, indexes, files, or other data structures. A video content server 1102 may access a data store (not shown) of various video segments. The video content server 1102 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 1104 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 1100, a public service message, or some other information. The video advertising server 1104 may serve the video advertising segments as directed by a user interface controller (not shown).

The video streaming system 1100 also may include action feed generator 108.

The video streaming system 1100 may further include an integration and streaming component 1107 that integrates video content and video advertising into a streaming video segment. For example, streaming component 1107 may be a content server or streaming media server. A controller (not shown) may determine the selection or configuration of advertising in the streaming video based on any suitable algorithm or process. The video streaming system 1100 may include other modules or units not depicted in FIG. 11, for example administrative servers, commerce servers, network infrastructure, advertising selection engines, and so forth.

The video streaming system 1100 may connect to a data communication network 1112. A data communication network 1112 may comprise a local area network (LAN), a wide area network (WAN), for example, the Internet, a telephone network, a wireless cellular telecommunications network (WCS) 1114, or some combination of these or similar networks.

One or more client devices 1120 may be in communication with the video streaming system 1100, via the data communication network 1112 and/or other network 1114. Such client devices may include, for example, one or more laptop computers 1120-1, desktop computers 1120-2, "smart" mobile phones 1120-3, tablet devices 1120-4, network-enabled televisions 1120-5, or combinations thereof, via a router 1118 for a LAN, via a base station 1117 for a wireless telephony network 1114, or via some other connection. In operation, such client devices 1120 may send and receive data or instructions to the system 1100, in response to user input received from user input devices or other input. In response, the system 1100 may serve video segments and metadata from the data store 1104 responsive to selection of media programs to the client devices 1120. Client devices 1120 may output the video content from the streaming video segment in a media player using a display screen, projector, or other video output device, and receive user input for interacting with the video content.

Distribution of audio-video data may be implemented from streaming component 1107 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 1107 may communicate with client device 1120 using control messages and data messages to adjust to changing network conditions as the video is played. These control messages can include commands for enabling control functions such as fast forward, fast reverse, pausing, or seeking to a particular part of the file at the client.

Since streaming component 1107 transmits video data only as needed and at the rate that is needed, precise control over the number of streams served can be maintained. The user will not be able to view high data rate videos over a lower data rate transmission medium. However, streaming media servers (1) provide users random access to the video file, (2) allow monitoring of who is viewing what video programs and how long they are watched, (3) use transmission bandwidth more efficiently, since only the amount of data required to support the viewing experience is transmitted, and (4) the video file is not stored in the user's computer, but discarded by the media player, thus allowing more control over the content.

Streaming component 1107 may use TCP-based protocols, such as HTTP and Real-time Messaging Protocol (RTMP). Streaming component 1107 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS). The HLS protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 12:
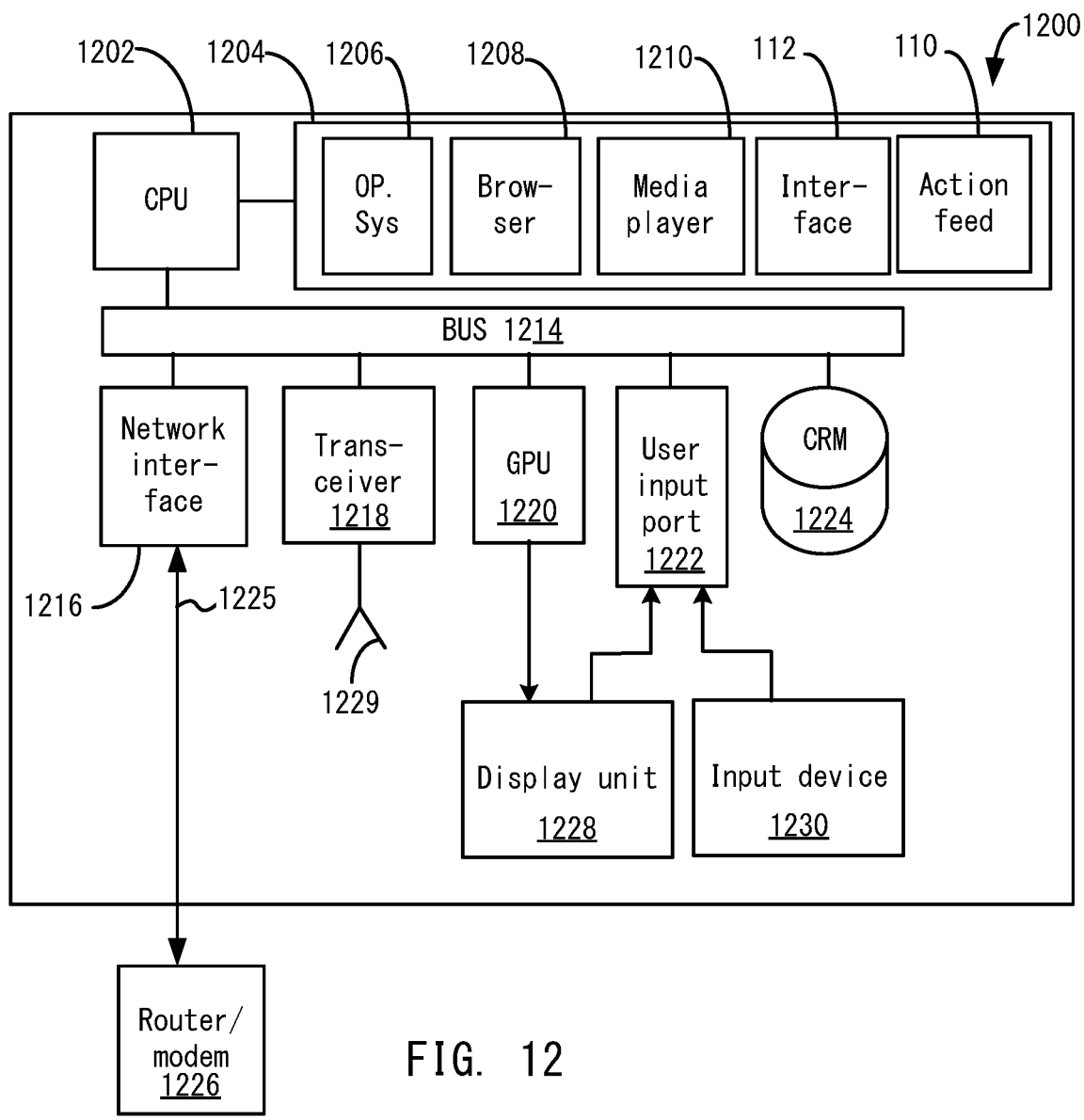
FIG. 12 depicts a diagrammatic view of an apparatus for viewing video content and advertisements.

Referring to FIG. 12, a diagrammatic view of an apparatus 1200 for viewing video content and advertisements is illustrated. In selected embodiments, the apparatus 1200 may include a processor (CPU) 1202 operatively coupled to a processor memory 1204, which holds binary-coded functional modules for execution by the processor 1202. Such functional modules may include an operating system 1206 for handling system functions such as input/output and memory access, a browser 1208 to display web pages, and media player 125 for playing video. The modules may further include modules to generate interface 112 and action feed 110. The memory 1204 may hold additional modules not shown in FIG. 12, for example modules for performing other operations described elsewhere herein.

A bus 1214 or other communication component may support communication of information within the apparatus 1200. The processor 1202 may be a specialized or dedicated microprocessor configured to perform particular tasks in accordance with the features and aspects disclosed herein by executing machine-readable software code defining the particular tasks. Processor memory 1204 (e.g., random access memory (RAM) or other dynamic storage device) may be connected to the bus 1214 or directly to the processor 1202, and store information and instructions to be executed by a processor 1202. The memory 1204 may also store temporary variables or other intermediate information during execution of such instructions.

A computer-readable medium in a storage device 1224 may be connected to the bus 1214 and store static information and instructions for the processor 1202; for example, the storage device (CRM) 1224 may store the modules 1206, 1208, 1210 and 1212 when the apparatus 1200 is powered off, from which the modules may be loaded into the processor memory 1204 when the apparatus 1200 is powered up. The storage device 1224 may include a non-transitory computer-readable storage medium holding information, instructions, or some combination thereof, for example instructions that when executed by the processor 1202, cause the apparatus 1200 to be configured to perform one or more operations of a method as described herein.

A communication interface 1216 may also be connected to the bus 1214. The communication interface 1216 may provide or support two-way data communication between the apparatus 1200 and one or more external devices, e.g., the streaming system 400, optionally via a router/modem 1226 and a wired or wireless connection. In the alternative, or in addition, the apparatus 1200 may include a transceiver 1218 connected to an antenna 1229, through which the apparatus 1200 may communicate wirelessly with a base station for a wireless communication system or with the router/modem 1226. In the alternative, the apparatus 1200 may communicate with a video streaming system 1100 via a local area network, virtual private network, or other network. In another alternative, the apparatus 1200 may be incorporated as a module or component of the system 1100 and communicate with other components via the bus 1214 or by some other modality.

The apparatus 1200 may be connected (e.g., via the bus 1214 and graphics processing unit 1220) to a display unit 1228. A display 1228 may include any suitable configuration for displaying information to an operator of the apparatus 1200. For example, a display 1228 may include or utilize a liquid crystal display (LCD), touchscreen LCD (e.g., capacitive display), light emitting diode (LED) display, projector, or other display device to present information to a user of the apparatus 1200 in a visual display.

One or more input devices 1230 (e.g., an alphanumeric keyboard, microphone, keypad, remote controller, game controller, camera or camera array) may be connected to the bus 1214 via a user input port 1222 to communicate information and commands to the apparatus 1200. In selected embodiments, an input device 1230 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1228, for example using a touch sensitive screen. A cursor control device may communicate direction information and command selections to the processor 1202 and control cursor movement on the display 1228. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   generating, by a computing device, a set of entities found on a video delivery system for a user;
   generating, by the computing device, a set of actions for the set of entities to form a set of action/entity pairs from the one or more entities and the set of actions, wherein each action/entity pair includes an action to be performed on an entity found on the video delivery system;
   generating, by the computing device, probabilities for the set of action/entity pairs based on a respective action and a respective entity in a respective action/entity pair, and user behavior of the user on the video delivery system, wherein a probability for an action/entity pair indicates the probability the user would select that action/entity pair when compared against other action/entity pairs;
   ranking, by the computing device, action/entity pairs in the set of action/entity pairs based on respective probabilities for the action/entity pairs;
   selecting, by the computing device, an action feed based on the ranking of the set of action/entity pairs, the action feed including at least a portion of the set of action/entity pairs; and
   outputting, by the computing device, the action feed to the client for display on an interface, wherein an action on an entity in the action feed is performed by the video delivery system when selected by the user on the interface displayed on the client.

2. The method of claim 1, wherein generating the set of actions for the set of entities is based on a probability the user would re-engage with the set of entities.

3. The method of claim 1, wherein generating the set of entities comprises:
   determining a first candidate set of entities the user has engaged within a first time period using the user behavior;
   determining a second candidate set of entities the user has not engaged within a second time period using the user behavior, the second candidate set of entities determined to be related to entities the user engaged; and
   selecting entities in the first candidate set of entities and the second candidate set of entities to include in the set of entities.

4. The method of claim 3, further comprising:
   determining if a probability the user would engage with the first candidate set of entities and the second candidate set of entities is above a threshold; and
   including entities in the first candidate set of entities and the second candidate set of entities in the set of entities that have the probability that meets the threshold.

5. The method of claim 1, wherein generating probabilities for the set of actions for the set of entities is based on a probability the user would select an action for an entity.

6. The method of claim 5, wherein generating probabilities for the set of action/entity pairs and ranking the action/entity pairs comprise:
   using actions the user selected and actions for entities the user did not select in the user behavior to rank the actions for the entities.

7. The method of claim 1, wherein generating the set of actions for the set of entities comprises:
   determining entities in an entity relationship graph that defines possible entities and relationships between the entities, wherein the entities are available for selection by the user on the video delivery system, and
   selecting the one or more actions for the set of entities from the entities in the entity relationship graph that are available for selection by the user.

8. The method of claim 1, wherein generating probabilities for the set of action/entity pairs and ranking the action/entity pairs:
   receiving a set of first actions for manually added entities and a set of second actions for engaged entities, the manually added entities being explicitly engaged by the user in the user behavior and the engaged entities being implicitly engaged by the user in the user behavior; and
   ranking the set of first actions for manually added entities and the set of second actions for engaged entities into a set of third actions based on probabilities for the set of first actions and the set of second actions.

9. The method of claim 8, wherein generating probabilities for the set of action/entity pairs and ranking the action/entity pairs:
   receiving a set of fourth actions for discovered entities other than the engaged entities and manually added entities, the discovered entities being determined based on a relevance between the engaged entities and the different entities; and
   ranking the set of fourth actions for the discovered entities based on probabilities for the set of fourth actions.

10. The method of claim 9, wherein generating probabilities for the set of action/entity pairs and ranking the action/entity pairs:
    receiving a set of fifth actions for a set of campaigns, the set of campaigns promoting campaign entities; and
    ranking the set of fifth actions for the campaign entities in the set of campaigns based on probabilities for the set of fifth actions.

11. The method of claim 10, wherein generating probabilities for the set of action/entity pairs and ranking the action/entity pairs:
    ranking the set of fifth actions based on a campaign urgency; and
    ranking the set of fifth actions based on entity availability on the video delivery system for each campaign and the campaign urgency based on probabilities for the set of fifth actions.

12. The method of claim 11, wherein generating probabilities for the set of action/entity pairs and ranking the action/entity pairs:

receiving the ranked set of third actions and the ranked set of fourth actions; and ranking the ranked set of third actions and the ranked fourth actions together into a set of sixth actions based on probabilities for the ranked set of third actions and the ranked set of fourth actions.

13. The method of claim 12, wherein generating probabilities for the set of action/entity pairs and ranking the action/entity pairs:

receiving the set of sixth actions and the ranked fifth actions; and ranking the set of sixth actions and the ranked fifth actions together into a set of seventh actions based on probabilities for the set of sixth actions and the ranked set of fifth actions, wherein the set of seventh actions is used to select the action feed.

14. The method of claim 1, wherein generating probabilities for the set of action/entity pairs comprises:

using a real-time context associated with the user to generate the probabilities for the set of actions for the set of entities.

15. The method of claim 1, wherein outputting the action feed comprises:

filtering the set of action/entity pairs based on filter criteria to select the at least the portion of the set of actions for the set of entities.

16. The method of claim 1, further comprising:

receiving a selection of an action in the action feed; and using a link for the action to perform the action on the video delivery system.

17. The method of claim 1, further comprising:

sending videos to the user that is using the video delivery system on a client; and receiving the user behavior for the user, wherein the user behavior includes actions taken by the user on the video delivery system.

18. The method of claim 1, wherein:

generating the set of actions for the set of entities is performed by a first predictor, and generating probabilities for the set of actions for the set of entities is performed by a second predictor that is different from the first predictor.

19. A non-transitory computer-readable storage medium containing instructions, that when executed, control a computer system to be configured for:

generating a set of entities found on a video delivery system for a user;

generating a set of actions for the set of entities to form a set of action/entity pairs from the one or more entities and the set of actions, wherein each action/entity pair includes an action to be performed on an entity found on the video delivery system;

generating probabilities for the set of action/entity pairs based on a respective action and a respective entity in a respective action/entity pair, and user behavior of the user on the video delivery system, wherein a probability for an action/entity pair indicates the probability the user would select that action/entity pair when compared against other action/entity pairs;

ranking action/entity pairs in the set of action/entity pairs based on respective probabilities for the action/entity pairs;

selecting an action feed based on the ranking of the set of action/entity pairs, the action feed including at least a portion of the set of action/entity pairs; and outputting the action feed to the client for display on an interface, wherein an action on an entity in the action feed is performed by the video delivery system when selected by the user on the interface displayed on the client.

20. An apparatus comprising:

one or more computer processors; and a non-transitory computer-readable storage medium comprising instructions, that when executed, control the one or more computer processors to be configured for:

generating a set of entities found on a video delivery system for a user;

generating a set of actions for the set of entities to form a set of action/entity pairs from the one or more entities and the set of actions, wherein each action/entity pair includes an action to be performed on an entity found on the video delivery system;

generating probabilities for the set of action/entity pairs based on a respective action and a respective entity in a respective action/entity pair, and user behavior of the user on the video delivery system, wherein a probability for an action/entity pair indicates the probability the user would select that action/entity pair when compared against other action/entity pairs;

ranking action/entity pairs in the set of action/entity pairs based on respective probabilities for the action/entity pairs;

selecting an action feed based on the ranking of the set of action/entity pairs, the action feed including at least a portion of the set of action/entity pairs; and outputting the action feed to the client for display on an interface, wherein an action on an entity in the action feed is performed by the video delivery system when selected by the user on the interface displayed on the client.

* * * * *